United States Patent
Milanović

(10) Patent No.: US 8,427,657 B2
(45) Date of Patent: Apr. 23, 2013

(54) DEVICE FOR OPTICAL IMAGING, TRACKING, AND POSITION MEASUREMENT WITH A SCANNING MEMS MIRROR

(75) Inventor: Veljko Milanović, Richmond, CA (US)

(73) Assignee: Mirrorcle Technologies, Inc., Richmond, CA (US)

(*) Notice: Subject to any disclaimer, the term of this patent is extended or adjusted under 35 U.S.C. 154(b) by 0 days.

(21) Appl. No.: 13/354,541

(22) Filed: Jan. 20, 2012

(65) Prior Publication Data

US 2012/0168605 A1 Jul. 5, 2012

Related U.S. Application Data

(63) Continuation of application No. 12/538,093, filed on Aug. 7, 2009, now Pat. No. 7,924,441.

(60) Provisional application No. 61/434,652, filed on Jan. 20, 2011, provisional application No. 61/087,604, filed on Aug. 8, 2008.

(51) Int. Cl.
*G01B 11/14* (2006.01)

(52) U.S. Cl.
USPC . 356/614; 250/342; 250/559.33; 250/559.29; 356/139.01; 356/141.1; 356/615; 356/623

(58) Field of Classification Search .......... 250/342, 250/559.29, 559.31, 559.32, 559.33, 559.37, 250/559.38; 356/614, 615, 623, 138, 139.01, 356/152.2, 140, 141.1, 141.5

See application file for complete search history.

(56) References Cited

U.S. PATENT DOCUMENTS

| 4,492,465 A | 1/1985 | Erdmann et al. |
| 4,662,746 A | 5/1987 | Hornbeck |
| 4,710,732 A | 12/1987 | Hornbeck |
| 4,838,696 A | 6/1989 | Pryor |
| 4,956,619 A | 9/1990 | Hornbeck |

(Continued)

OTHER PUBLICATIONS

U.S. Appl. No. 61/434,652, filed Jan. 20, 2011, entitled "Device for Optical Imaging, Tracking, and Position Measurement With a Scanning MEMS Mirror".

(Continued)

*Primary Examiner* — Gregory J Toatley
*Assistant Examiner* — Iyabo S Alli
(74) *Attorney, Agent, or Firm* — Joshua D. Isenberg; JDI Patent

(57) ABSTRACT

An optical tracking system can include at least one scanning detector having a scanning mirror and one or more fixed photo-detectors located near the scanning mirror. The scanning mirror can be configured to deflect a light beam from a source towards a retroreflective target and the photodetectors are configured to collect a portion of the light beam that is retroreflected from the target. A scanning optical detector apparatus may optionally comprise a substrate, a scanning mirror having at least one portion monolithically integrated into the substrate, and one or more photodetectors monolithically incorporated into the substrate. It is emphasized that this abstract is provided to comply with rules requiring an abstract that will allow a searcher or other reader to quickly ascertain the subject matter of the technical disclosure. It is submitted with the understanding that it will not be used to interpret or limit the claims' scope or meaning.

20 Claims, 21 Drawing Sheets

U.S. PATENT DOCUMENTS

| | | | |
|---|---|---|---|
| 5,061,049 A | 10/1991 | Hornbeck | |
| 5,079,545 A | 1/1992 | Priem | |
| 5,083,857 A | 1/1992 | Hornbeck | |
| 5,105,369 A | 4/1992 | Nelson | |
| 5,172,262 A | 12/1992 | Hornbeck | |
| 5,278,652 A | 1/1994 | Urbanus | |
| 5,305,091 A | 4/1994 | Gelbart et al. | |
| 5,469,302 A | 11/1995 | Lim | |
| 5,535,047 A | 7/1996 | Hornbeck | |
| 5,661,591 A | 8/1997 | Lin et al. | |
| 6,256,016 B1 * | 7/2001 | Piot et al. | 250/208.2 |
| 6,311,894 B1 | 11/2001 | Miyajima et al. | |
| 6,480,320 B2 | 11/2002 | Nasiri | |
| 6,593,677 B2 | 7/2003 | Behin et al. | |
| 6,747,284 B2 * | 6/2004 | Bohn | 250/208.1 |
| 6,865,313 B2 | 3/2005 | Mao et al. | |
| 7,078,672 B2 | 7/2006 | Xie et al. | |
| 7,184,022 B2 | 2/2007 | Xie et al. | |
| 7,295,726 B1 | 11/2007 | Milanovic | |
| 7,359,041 B2 * | 4/2008 | Xie et al. | 356/141.1 |
| 7,428,353 B1 | 9/2008 | Milanovic | |
| 7,576,863 B2 * | 8/2009 | Weibel | 356/445 |
| 7,924,441 B1 | 4/2011 | Milanovic | |
| 8,043,513 B2 | 10/2011 | Milanovic | |
| 2002/0071169 A1 | 6/2002 | Bowers | |
| 2002/0075554 A1 | 6/2002 | Brophy | |
| 2004/0081391 A1 | 4/2004 | Ko et al. | |
| 2004/0252936 A1 | 12/2004 | Despont et al. | |
| 2005/0018322 A1 | 1/2005 | Ben-Gad et al. | |

OTHER PUBLICATIONS

U.S. Appl. No. 61/087,604, filed Aug. 8, 2008 entitled "Method of optical tracking of an object and determination of its position in 3D space".

U.S. Appl. No. 60/526,510, entitled "Fabrication of microactuators and their applications to laser beam scanning, optical phased arrays, adaptive optics and other optical applications" filed Dec. 2, 2003.

U.S. Appl. No. 12/781,766, filed May 17, 2010, entitled "MEMS Actuators With Combined Force and Bi-Directional Rotation".

V.Milanovic, D.T. McCormick, G.Matus, "Gimbla-less Monolithic Silicon Actuators for Tip-Tilt-Piston Micromirror Applications",IEEE J. of Select Topics in Quantum Electronics, Vol. 10,Issue: 3, May-Jun. 2004, pp. 462-471.

J. Brophy-Warren, "Magic Wand: How Hackers Make Use of Their Wii-motes," The Wall Street Journal, Apr. 28, 2007 download from http://www.discussanything.com/forums/showthread.php?t=103730 on Sep. 14, 2010.

P. Arcara, et al, "Perception of Depth Information by Means of a Wire-Actuated Haptic Interface," Proc. of 2000 IEEE Int. Conf. on Robotics and Automation, Apr. 2000.

A. Cassinelli, et al, "Smart Laser-Scanner for 3D Human-Machine Interface," Int. Conf. on Human Factors in Computing Systems, Portland, OR, Apr. 2-7, 2005, pp. 1138-1139.

S Perrin, et al. "Laser-Based Finger Tracking System Suitable for MOEMS Integration," Image and Vision Computing, New Zealand, Nov. 26-28, 2003, pp. 131-136.

F. Blais, J.-A. Beraldin, S. El-Hakim, and L. Cournoyer, "Comparison of Pose Estimation Methods for a 3D Laser Tracking System using Triangulation and Programmetry Techniques," SPIE Proceedings, Electronic Imaging 2001, Videometrics and Optical Methods for 3D Shape Measurement VII, San Jose, CA. Jan. 21-26, 2001.

V. Milanovic, W. K. Lo, "Fast and High-Precision 3D Tracking and Position Measurement with MEMS Micromirrors", 2008 IEEE/LEOS International Conference on Optical MEMS and Nanophotonics, ISBN: 978-1-4244-1917-3, pp. 72-73, Freiburg, Germany, Aug. 11-14, 2008.

D. Hah, et al. "A Self-Aligned Vertical Comb-Drive Actuator on an SOI Wafer for a 2D Scanning Micromirror", Institute of Physics Publishing, Journal of Micromechanics and Microengineering, 2004, vol. 14, p. 1148-1156.

D. H. Hah, et al, "Theory and Experiments of Angular Vertical Comb-Drive Actuators for Scarrning Micromirrors", IEEE Journal of Selected Topics in Quantum Electronics, vol. 10, No. 3, May/Jun. 2004, p. 505-513.

V. Milanovic, et al., "Monolithic Silicon Micrornirrors with Large Scanning Angle," Optical MEMS'OI, Okinawa, Japan, Sep. 2001.

R. Conant, et al, "A Flat High-Frequency Scanning Micromirror," Proc. Solid-State Sensor and Actuator Workshop, Hilton Head, South Carolina, 00. 6-9, Jun. 4-8, 2000.

J. T. Nee, et al, "Lightweight, optically flat rnicromirrors for fast beam steering," 2000 IEEE/LEOS Int. Conference on Optical MEMS, Kauai, HI, Aug. 21-24, 2000, p. 9-1O.

U. Krishnamoorthy, O. Solgaard, "Self-Aligned Vertical Comb-drive Actuators for Optical Scanning Micromirrors," 2000 IEEE/LEOS International Conference on Optical MEMS, Okinawa, Japan, Sep. 2001.

V. Milanovic, "Multilevel-Beam SOI-MEMS Fabrication and Applications," J. of Microelectromechanical Systems, vol. 13, No. I, pp. 19-30, Feb. 2004.

V. Milanovic, S. Kwon, L. P. Lee, "Monolithic Vertical Combdrive Actuators for Adaptive Optics," IEEE/LEOS Int. Conference on Optical MEMS, Switzerland, Aug. 2002.

S. Kwon, V. Milanovic, L. P. Lee, "Vertical Microlens Scanner for 3D Imaging," Proc. Solid-State Sensor and Actuator Workshop, Hilton Head, South Carolina, Jun. 2002.

S. Kwon, V. Milanovic, L. P. Lee, "A High Aspect Ratio 2D Gimbaled Microscanner with Large Static Rotation," IEEE/LEOS Int. Conf. on Optical MEMS'02, Switzerland, Aug. 2002.

H. Schenk, et al, "Large Deflection Micromechanical Scanning Mirrors for Linear Scans and Pattern Generation," IEEE J. of Selected Topics in Quantum Electronics, vol. 6, No. 5, Sep./Oct. 2000.

T. Brosnihan, et al, "Embedded Interconnect and Electrical Isolation for High-Aspect-Ratio, SOI Inertial Instruments," Proceedings of the 1997 Int. Conf. on Solid-State Sensors and Actuators, Chicago, Jun. 16-19, 1997, p. 637-640.

V. Milanovic, G. Matus, T. Cheng, B. Cagdasar, "Monolithic High Aspect Ratio Two-axis Optical Scanner in SOI," Int. Conf. on Microelectromechanical Systems, MEMS2003, Kyoto, Japan, pp. 255-258, Jan. 2003.

F. Niklaus, S. Haasl and G. Stemme, "Arrays of monocrystalline silicon micromirrors fabricated using CMOS compatible transfer bonding," J. ofMEMS , v 12, n 4, Aug. 2003, p. 465-469.

U. Srinivasan, et al, "Fluidic self-assembly of micromirrors onto microactuators using capillary forces," IEEE J. of Spec. Topics in Quantum Electronics, vol. 8 (I), pp. 4-11, Jan. 2002.

C. Rembe, et al, "Stroboscopic interferometer with variable magnification to measure dynamics in an adaptiveoptics micromirror," 2000 IEEE/LEOS Int. Conf. on Optical MEMS, Aug. 21-24, 2000.

J.-C. Tsai, et al, "Analog Micromirror Arrays with Orthogonal Scanning Directions for Wavelength Selective IxN2 Switches," Transducers '03, pp. 1776-1779, Jun. 2003.

J.-L. A. Yeh, et al, "Electrostatic Model for an Asynunetric Cornbdrive", J. of MEMS, vol. 9, No. I, Mar. 2000.

Jin-Ho Lee et al "Fabrication of silicon optical scanner for laser display," 2000 IEEE/LEOS International Conference on Optical MEMS, Kauai, HI, Aug. 21-24, 2000, p. 13-14.

J. M.-L. Tsai, H.-Y. Chu, J. Hsieh, and W. Fang, "The BELST II process for a silicon high-aspect-ratio micromaching vertical comb actuator and its applications," J. Micromechanics and Microengineering 14, pp. 235-241, Nov. 2003.

V. Milanovic, S. Kwon, L. P. Lee, "High Aspect Ratio Micromirrors With Large Static Rotation and Piston Actuation", IEEE Photonics Technology Letters, vol. 16, No. 8, Aug. 2004, p. 1891-1893.

"MEMS Precision Instruments" downloaded from Internet, downloaded from <http://www.memspi.com> on Mar. 1, 2006.

V. Milanovic, "Multilevel-Beam SOI-MEMS for Optical Applications," Proc. 9th IEEE Int. Can! on Electronics, Circuits and Systems—ICECS'02, Dubrovnik, Croatia, Sep. 2002. pp. 281-285.

V. Milanovic, K. Castelino, "Sub-IOO JIS Settling Time and Low Voltage Operation for Gimbal-less Two-Axis Scanners" , IEEEILEOS Optical MEMS 2004, Takamatsu, Japan, Aug. 2004.

Office Action in U.S. Appl. No. 12/538,093, mailed date :May 14, 2010.

Office Action in U.S. Appl. No. 11/465,835, mailed date: Feb. 14, 2008.

Office Action in U.S. Appl. No. 11/003,271 dated Apr. 5, 2006.

Final Office Action in U.S. Appl. No. 11/003,271 dated Oct. 26, 2006.

Office Action in U.S. Appl. No. 11/003,271 dated Feb. 16, 2007.

Notice of Allowability in U.S. Appl. No. 11/003,271 dated Jun. 28, 2007.

* cited by examiner

DEVICE FOR OPTICAL IMAGING, TRACKING, AND POSITION MEASUREMENT WITH A SCANNING MEMS MIRROR

CLAIM OF PRIORITY

This application claims the priority benefit of U.S. Provisional Patent Application No. 61/434,652 filed Jan. 20, 2011, the contents of which are incorporated herein by reference.

This application is a continuation of and claims the priority benefit of U.S. patent application Ser. No. 12/538,093, filed Aug. 7, 2009 (now U.S. Pat. No. 7,924,441), which was co-pending with U.S. Provisional Patent Application 61/434,652. U.S. patent application Ser. No. 12/538,093 is a non-provisional of U.S. Provisional Patent Application No. 61/087,604, filed Aug. 8, 2008, the entire contents of which are incorporated herein by reference.

This application is a non-provisional of and claims the priority benefit of U.S. Provisional Patent Application No. 61/087,604.

CROSS-REFERENCE TO RELATED APPLICATIONS

This application is related to U.S. Pat. No. 7,295,726, US Patent Application Publication number 20080061026, U.S. patent application Ser. No. 11/465,835 (now U.S. Pat. No. 7,428,353), and U.S. Provisional Patent Application No. 60/526,510, the contents of all five of which are incorporated herein by reference.

BACKGROUND OF INVENTION

Obtaining real-time 3D co-ordinates of a moving object has many applications such as gaming [1], robotics and human-computer interaction applications [2-4], industrial applications etc. Various technologies have been investigated for and used in these applications, including sensing via wire-interfaces [2], ultrasound, and laser interferometry. However a simple and low cost solution that can provide enough precision and flexibility has not been available. Recent proliferation of low-cost inertial sensors has not addressed the problem of position tracking. Cassinelli et al demonstrated a scanning mirror-based tracking solution [3-4]; however their system does not solve the problem of object searching/selecting and does not have adequate depth (Z-axis) measurements.

In addition it is often desirable to obtain good resolution on the position of the object when it is close to the tracking system. Unfortunately, many existing tracking systems tend to lose resolution when the object is close in.

Many video-based tracking systems utilize charge-coupled device (CCD) arrays to obtain position information from an image of the object that is being tracked. Unfortunately, the image is two-dimensional and additional information is usually needed in order to derive three-dimensional position information. In addition, a CCD typically has a limited field of view. Furthermore, there is a large cost differential associated with increasing the resolution of CCD array.

Another technology is barcode scanning which uses a scanning mirror, a light source and a photo sensor to receive the varying reflected back light source from the barcode to extrapolate varying voltages and further information from there. This type of system requires the barcode to be stationary as it is being scanned. Similarly, other scanning technologies such as flatbed scanners use the setup of measuring the voltage from a photo sensor of the amount of light that is scanned and reflected back from an object that is stationary. The restriction in this case is the same as above with CCD sensors, which is the scan is in two dimensions.

In any such imaging, tracking, or position measurement applications which incorporate optical beam scanning and receiving of light by a photosensor, it would be desirable to utilize the miniature size and low-power scanning capability of MEMS mirrors. The small size of the scanning unit could result in lower cost, faster scanning, and portable implementations, but it creates a problem for the system designer in that the small mirror aperture receives a very tiny portion of the reflected light, perhaps too low for most applications. Therefore it is of interest to decouple the design of the scanning/mirror unit (keep it very small,) and the receiving or photo-sensing unit (keep it as large as necessary to receive enough optical power.)

It is within this context that embodiments of the present invention arise.

OBJECTIVES

The objective of the work that led to embodiments of the present invention was to develop and demonstrate an optical-MEMS based, very low cost and versatile platform for tracking and position measurement in a variety of situations. The platform could also be used in bar-code scanning, LIDAR, biomedical imaging, and other types of imaging and 3D scanning applications. Use of MEMS mirrors with the potential to use wide-angle lenses provides the possibility of tracking and imaging in a very large volume, and very far distances (e.g. use of remote-control IR source-detector modules can provide a range of 50 m or more). At the same time the technology provides low-cost production, high speed, small size, and very low power consumption.

A brief discussion of this work is included in the abstract to a presentation for SPIE Photonics West 2011 by Veljko Milanović et al, entitled "Fast and High-Precision 3D Tracking and Position Measurement with MEMS Micromirrors", which is incorporated herein by reference.

SUMMARY

According to an embodiment of the present invention, a system for optically locating and tracking an object in three dimensions and measuring a position in three dimensions, may comprise two or more optical scanners, one or more optical detectors, and a controller. Each optical scanner has a reflector mounted to a two-dimensional actuator configured to control a tilt of the reflector about a first axis and a second axis. The one or more optical detectors are responsive to radiation from one or more optical sources. The controller is coupled to the one or more optical detectors and first and second optical scanners. The controller is configured to determine from one or more detection signals from the one or more optical detectors whether a given reflector of a given scanner is aligned to provide an optical path between the one or more optical sources and the one or more optical detectors. The optical path originates, terminates or is deflected at the object. The controller is also configured to determine a position of the object in three dimensions from control signals to the two-dimensional actuators of each of the two or more optical scanners obtained when each reflector is aligned to provide the optical path between the one or more optical sources and the one or more optical detectors. The control signals determine a tilt of each reflector about its first and second axes.

In some embodiments, the two or more optical scanners may include two or more MEMS optical scanners.

According to an embodiment, the one or more optical sources may include two or more distinct optical sources, wherein each optical source is optically coupled to a different one of the two or more optical scanners. In such an embodiment the two or more distinct optical sources may be distinguished by different modulation of radiation from the two or more distinct optical sources, by different wavelengths of radiation from the two or more distinct optical sources, or by time multiplexing of radiation from the two or more distinct optical sources. In such an embodiment the target object may be configured to selectively reflect one or more of the distinct source wavelengths or polarizations, such that for example multiple targets can be identified and individually tracked or imaged.

In some embodiments, the one or more optical sources may include an optical source that either is the object or is configured to be attached to the object. In such a case the one or more optical detectors may include two or more optical detectors wherein each optical detector is optically coupled to a different one of the two or more optical scanners.

In some embodiments, the one or more optical sources may include two or more optical sources. Each optical source may be optically coupled to a different one of the two or more optical scanners and wherein the one or more optical detectors includes two or more optical detectors wherein each optical detector is located proximate a different one of the two or more optical scanners.

In some embodiments, the two or more scanners, one or more optical sources, one or more optical detectors and the controller may be configured such that the controller can determine angles of tilt of each reflector about its first and second axes with a resolution of greater than 10 bits.

In some embodiments, the two or more scanners, one or more optical sources, one or more optical detectors and the controller may be configured such that the controller can determine the three-dimensional position of the object at a bandwidth of 10 kilohertz or more.

In some embodiments, the controller may be configured to provide control the two-dimensional actuators of the two or more optical scanners. In such an embodiment, the controller may optionally be further configured to scan the two or more optical scanners in a spiral pattern. In such an embodiment, the controller may optionally be configured to adjust a scan of the angles of the reflectors about their first and second axes in response to the one or more detection signals. In such a case, the controller may be configured to adjust an origin of a scan to correspond to a previous known position of the object.

According to another embodiment, a method for optically locating and tracking an object in three dimensions and measuring a position in three dimensions may comprise:
a) scanning a first reflector about a first axis and a second axis;
b) scanning a second reflector about a third axis and a fourth axis;
c) generating radiation with one or more optical sources;
d) reflecting the radiation with the first and second reflectors while scanning the first and second reflectors;
e) using one or more optical detectors to determine when the first and second reflectors provide first and second optical paths between the one or more optical sources and the one or more optical detectors, wherein the optical path originates, terminates or is deflected at the object;
f) determining values of the first and second angles of rotation of the first reflector with respect to the first and second axes at a time when the first reflectors provides the first optical path;
g) determining values of the third and fourth angles of rotation of the second reflector with respect to the third and fourth axes at a time when the second reflector provides the second optical path; and
h) determining a position of the object in three dimensions from the values of the first, second, third and fourth angles.

In some versions of the above method of claim c) may include generating first and second distinct optical radiation signals and wherein the one or more optical detectors include an optical detector that is the object or is attachable to the object.

In other versions of the above method, c) may include generating an optical signal with a source that either is the object or is attachable to the object, wherein the one or more detectors include first and second optical detectors respectively located proximate the first and second reflectors.

In still other versions of the above method, c) may include generating first and second distinct optical radiation signals and deflecting the first and second optical radiation signals at the object. In such a case, the one or more detectors include first and second optical detectors respectively located proximate the first and second reflectors.

In some versions of the above method, a) and b) may include scanning the first and second reflectors in spiral patterns.

Some versions of the above method may further comprise adjusting the scanning of the first or second reflector in response to a determination that the first and second reflectors provide the first and second optical paths between the one or more optical sources and the one or more optical detectors. In such a version, adjusting the scanning may include adjusting an origin of the scanning of the first or second reflector to correspond to a previous known position of the object. Alternatively, the scanning may be adjusted by adjusting range of the scanning in response to the determination that the first and second reflectors provide the first and second optical paths.

DETAILED DESCRIPTION

According to an embodiment of the present invention a system may be created that may be e.g. attached to a personal computer, to allow a computer to continuously monitor the 3D position of an object. The object may be held in the hand of a human user and moved about by hand in an arbitrary manner. In addition, the computer may take derivatives of the position measurement and thus obtain velocity and acceleration data of that object in 3D space. The object being waved by the user may include a retro reflector or may be one or multiple retro reflectors. In other embodiments the object may be an optical source.

Applications exist where a light source and a photo detector are used to scan objects, such as a barcode scanner, flatbed scanner, biomedical imaging and microscopy, OCT-type 3D imaging, 3D scanning and digitization of objects, and some applications of LiDAR. In the case of a barcode scanner, the light source is scanned across a barcode, and the light reflected back onto the photo detector is affected by the dark lines and white spaces on the barcode. The changes in voltage levels on the photo detector is then further processed for other information. Flatbed scanners take in information in the same way where a light source scans over a given object, and the amount of light reflected back can be stored specifically as simple black and white data, or using more complicated photo detectors and algorithms, color data of the object scanned. Some applications of LiDAR include scanning large stationary objects to find details that might be obstructed to view directly with the eye.

Figure 1A:
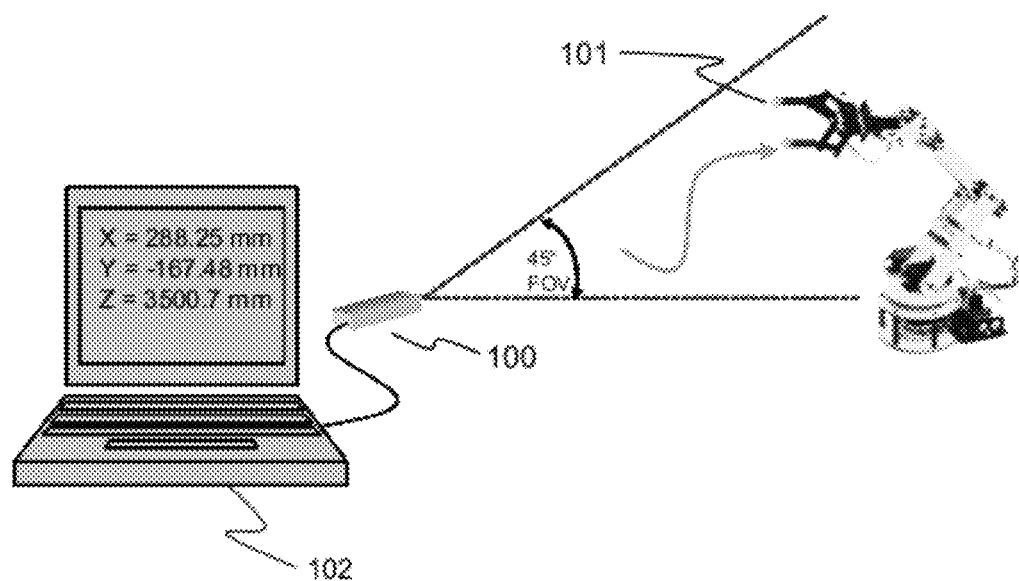
FIGS. 1A-1B illustrate the application or problem being solved by an embodiment of the present invention.
Figure 1B:
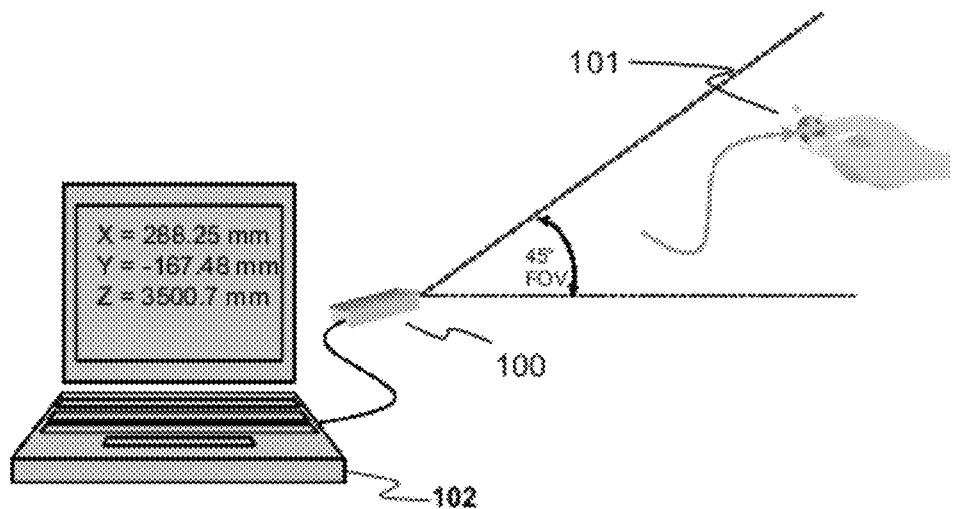

Several beam-steering based techniques may be used to track an object inside a conic volume. For example, as depicted in FIG. 1A and FIG. 1B, two laser beams may be scanned by a scanner 100 having two MEMS mirrors that scan the beams into a common volume or field of view (FOV). The MEMS mirrors are capable of scanning about two axes and can be controlled by suitably configured software running on a programmable controller 102 such as a general-purpose computer. Examples of suitable MEMS mirrors are described, e.g., in U.S. Pat. No. 7,295,726, US Patent Application Publication number 20080061026, U.S. patent application Ser. No. 11/465,835, and U.S. Provisional Patent Application No. 60/526,510, the contents of all four of which have been incorporated herein by reference above.

Figure 2A:
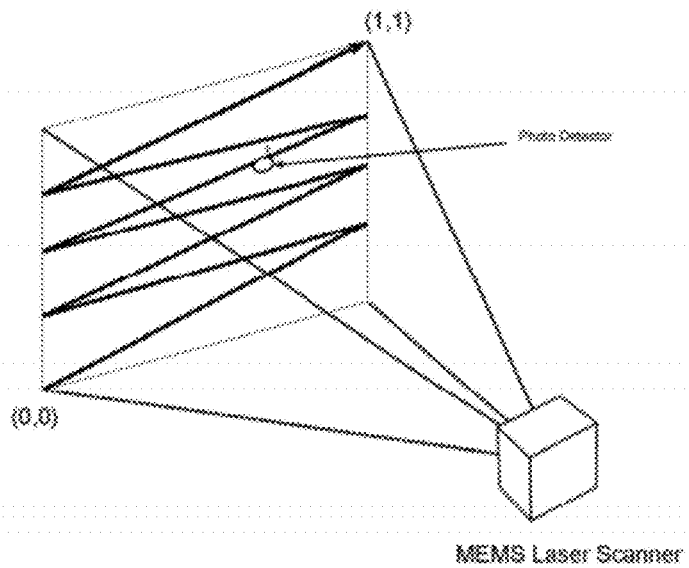
FIG. 2A depicts an optical beam-steering system scanning a laser beam in a rastering pattern in 3D space in accordance with an embodiment of the invention.

FIG. 2A depicts an optical beam-steering system scanning a laser beam in a rastering pattern in 3D space in accordance with an embodiment of the invention. The pattern begins from an angular position (0, 0) and terminates at position (1, 1) in normalized co-ordinates. In this example, light from one or more sources, e.g., lasers proximate the scanners, is deflected into the scanning volume. When a beam passes over an object which is or includes a photo-detector, the photo-detector will produce a signal which can allow the scanning system to determine its angular location with reference to the scanning system.

Figure 2B:
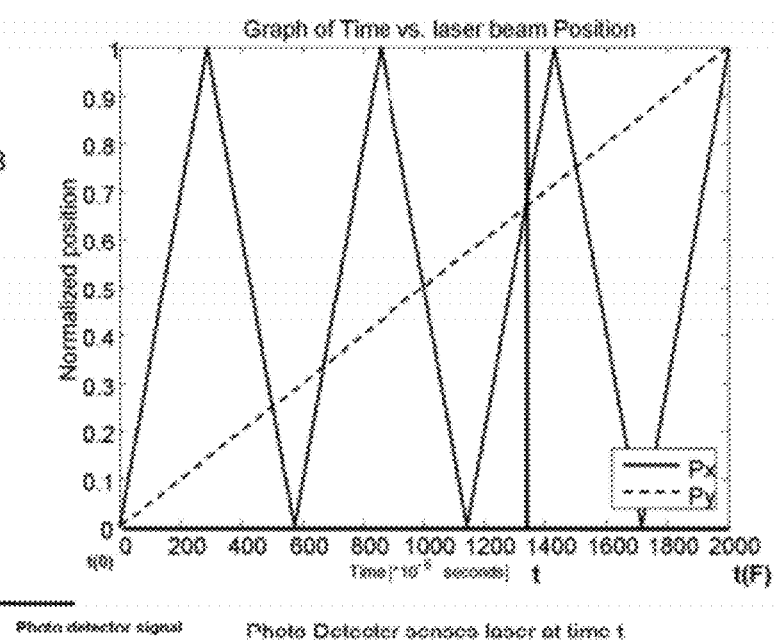
FIG. 2B is a graph showing an example of determining angular location of photo-detector with reference to scanning system described in FIG. 2A.

The graph depicted in FIG. 2B shows an example of determining angular location of photo-detector with reference to scanning system described in FIG. 2A. The angular position of beam in x- and y-axis is shown. The raster as shown in FIG. 2B has a continuously increasing vertical (y-axis) position (ramp function and zigzag pattern in x-axis (triangular wave pattern.) At the time when the beam crosses the photo-detector, the photo-detector will produce a detection signal. Due to the known (synchronous) time of signal detection with respect to the time of scan's beginning from position (0, 0); the system can determine the angular position of the photo-detector within one such scan.

The laser beam may be purposely made divergent so that it will cover a larger volume in raster-scanning and such that it will not leave any segments within that volume where the object can remain undetected.

Figure 3:
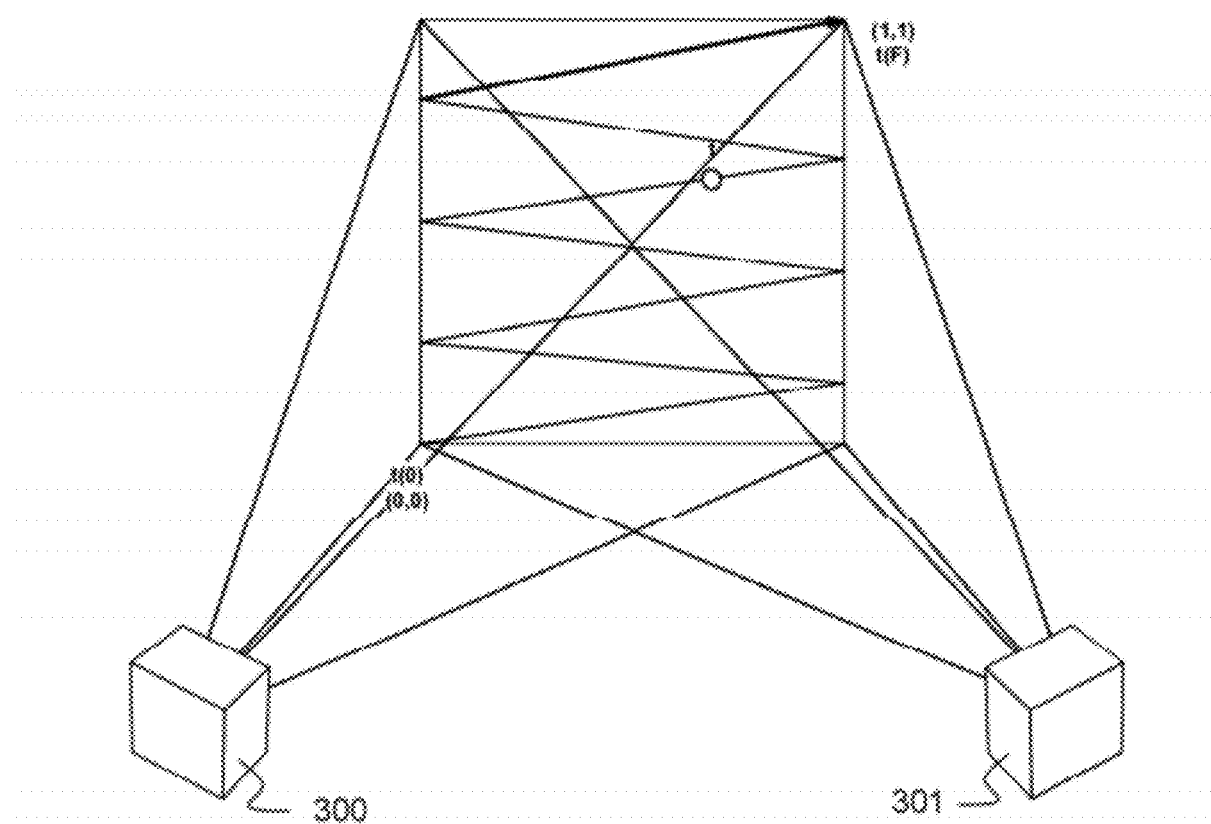
FIG. 3 depicts an embodiment in which two beam-steering systems are pointed to cover some shared volume with their respective scanning optical beams.

FIG. 3 depicts an embodiment in which two beam-steering systems, e.g., as described with respect to FIG. 2A and FIG. 2B, are pointed to cover some shared volume with their respective scanning optical beams. In this case the photo-detector produces a detection signal both when the beams from scanner system 300 beam passes over it as well as when the beam from scanner system 301 passes over it. Ambiguity as to which beam has passed over the photo-detector may be resolved either through time-multiplexing by scanning one system at a time (turning a beam on and off for each system,) or in wavelength or modulation (coding) differentiation.

Figure 4:
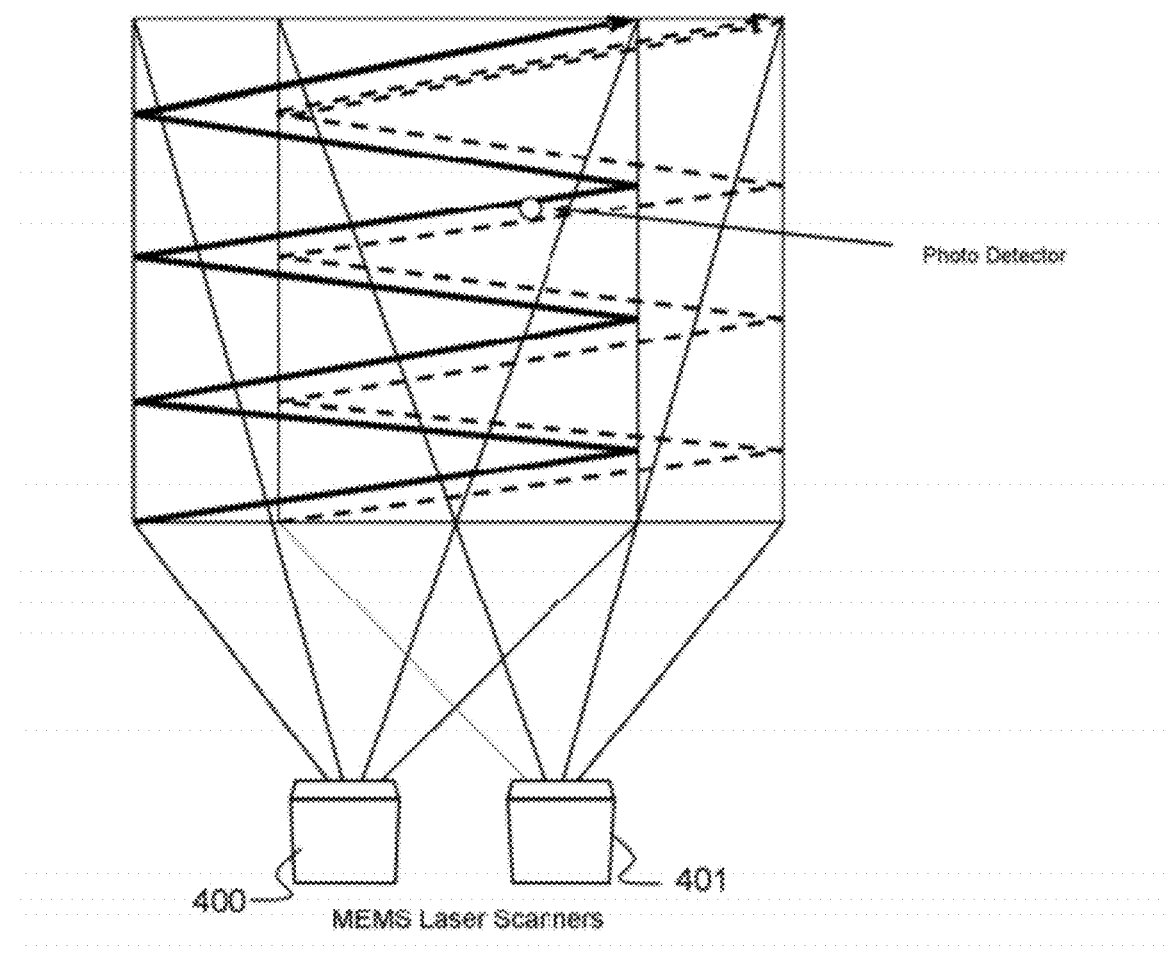
FIG. 4 depicts an embodiment of an optical tracking system in which two scanning systems pointed in the same direction but displaced laterally by a known distance (in x.) in accordance with an embodiment of the present invention

FIG. 4 depicts an embodiment of an optical tracking system in which two scanning systems 400, 401 pointed in the same direction but displaced laterally by a known distance along the x-direction. In this example, each scanning system is scanning a beam of a different wavelength. Thus the photo-detector (or multiple and co-incidental photo-detectors) can distinguish which scanner's beam it is detecting. Because the two scanning systems are laterally displaced the photo-detector is positioned at relatively different angles with respect to each scanning system's co-ordinate system. Therefore when the detector produces a signal due to a beam from one of the scanners passing over the detector, the respective scanner system will obtain angular co-ordinates which are different from the other. The combination of the two sets of obtained angular co-ordinates can then be used to obtain a linear position of the photo-detector in 3D space, such as e.g. X,Y,Z co-ordinates in meters. This spectroscopic method of obtaining distance information and overall 3D position information is similar to human vision.

Figure 5:
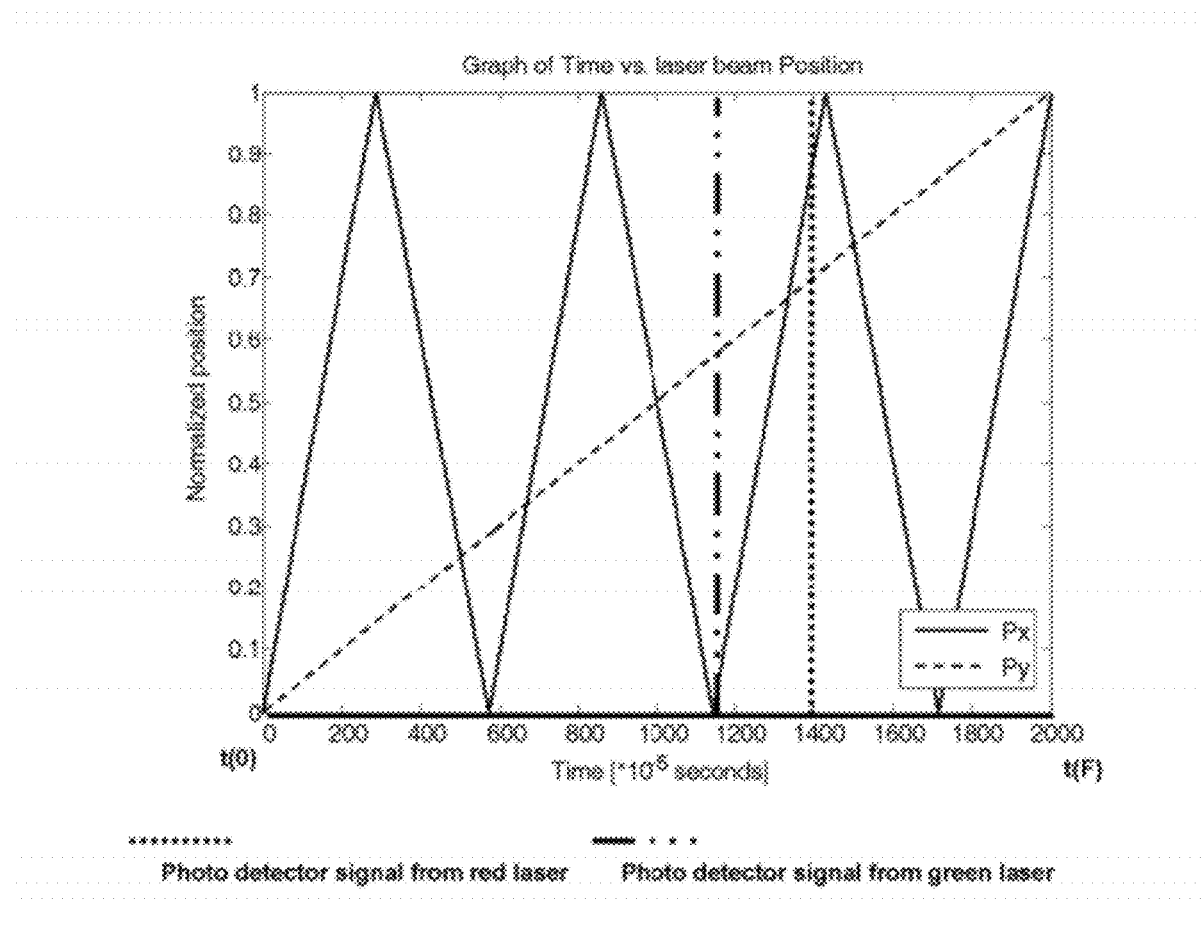
FIG. 5 is a graph showing an example of determining angular location of photo-detector with reference to two scanning systems described in FIG. 4.

FIG. 5 is a graph showing an example of determining angular location of photo-detector with reference to two scanning systems described in FIG. 4. Angular position of beam in x- and y-axis is shown. The raster as shown in FIG. 4 has a continuously increasing vertical position (ramp function) and zigzag pattern in x-axis (triangular wave pattern.) Both systems have such a raster but due to their displaced positions relative to each other and, therefore, relative position to the object (e.g., the photo-detector,) the photo-detector produces a signal for each system at different times. At the time when the beam from system 400 crosses the photo-detector, the photo-detector will produce a first detection signal. At the time when the beam from system 401 crosses the photo-detector, the photo-detector will produce a second distinguishable detection signal. Due to the known (synchronous) time of signal detection with respect to the time of scan's beginning from position (0, 0); the system can determine the angular position of the photo-detector within one such scan. Two sets of angular positions are therefore obtainable, and the combination of all these acquired angles is used to obtain a true 3D position, e.g., in terms of Cartesian coordinates X, Y, and Z.

By way of example, and not by way of limitation, the X and Y axes of both devices may be driven by separate channels of a 16-bit FPGA system. The devices may achieve angle (negative and positive) maxima (−θmax, +θmax) when the system sends a value of −K to +K to its output DAC, where K=$2^{15}$−1. In most of our experiments we calibrate our devices to provide θmax=10°, giving a total scan angle of 20°. When tracking, the FPGA system records the azimuth and elevation angle of pointing of mirror1, $\theta_{X1}$ and $\theta_{Y1}$. θ values can be calculated by the FPGA using the voltage ratios with K and θmax. The second mirror, spaced at a known distance d, provides angles $\theta_{X2}$ and $\theta_{Y2}$ (See FIG. 5). Both devices see nearly identical Y readings $\theta_{Y1}$ and $\theta_{Y2}$, but due to motion parallax the X readings are different and depend on the distance of the object.

$$X_1 = Z \cdot \tan(\theta_{X1}) \tag{1}$$

$$X_2 = Z \cdot \tan(\theta_{X2}) \tag{2}$$

$$Y_1 = Z \cdot \tan(\theta_{Y1}) \tag{3}$$

$$Y_2 = Z \cdot \tan(\theta_{Y2}) \tag{4}$$

$$d = X_1 - X_2 \tag{5}$$

The mirrors and corresponding lasers provide two tracking sub-systems, which are placed in parallel at a known distance d, and both track an object simultaneously, thereby obtaining azimuth information from two locations which allows distance triangulation. In the example described in FIG. 5, the two mirrors are driven synchronously in the X and Y directions to scan two different beams. Signals from the two different mirrors are distinguished at the detector by using two differently colored laser beams (e.g., red and green). The detector can provide distinct signals when it detects the red or green laser beam. Note that in FIG. 5, the red and green signals have sharp peaks at different times, which correspond to different positions for the two different mirrors.

Embodiments of the invention can utilize the multiple azimuth (X) readings to obtain a true distance of the object to the origin (a point directly between the two micromirrors) as:

$$Z = \frac{d}{(\tan(\theta_{X1}) - (\tan(\theta_{X2}))} \tag{6}$$

With Z known, X and Y can be found from known parameters and by averaging from two devices' readings:

$$X = \frac{X_1 + X_2}{2} = \frac{Z \cdot (\tan(\theta_{X1}) + \tan(\theta_{X2}))}{2} \tag{7}$$

$$Y = \frac{Y_1 + Y_2}{2} = \frac{Z \cdot (\tan(\theta_{Y1}) + \tan(\theta_{Y2}))}{2} \tag{8}$$

Figure 6:
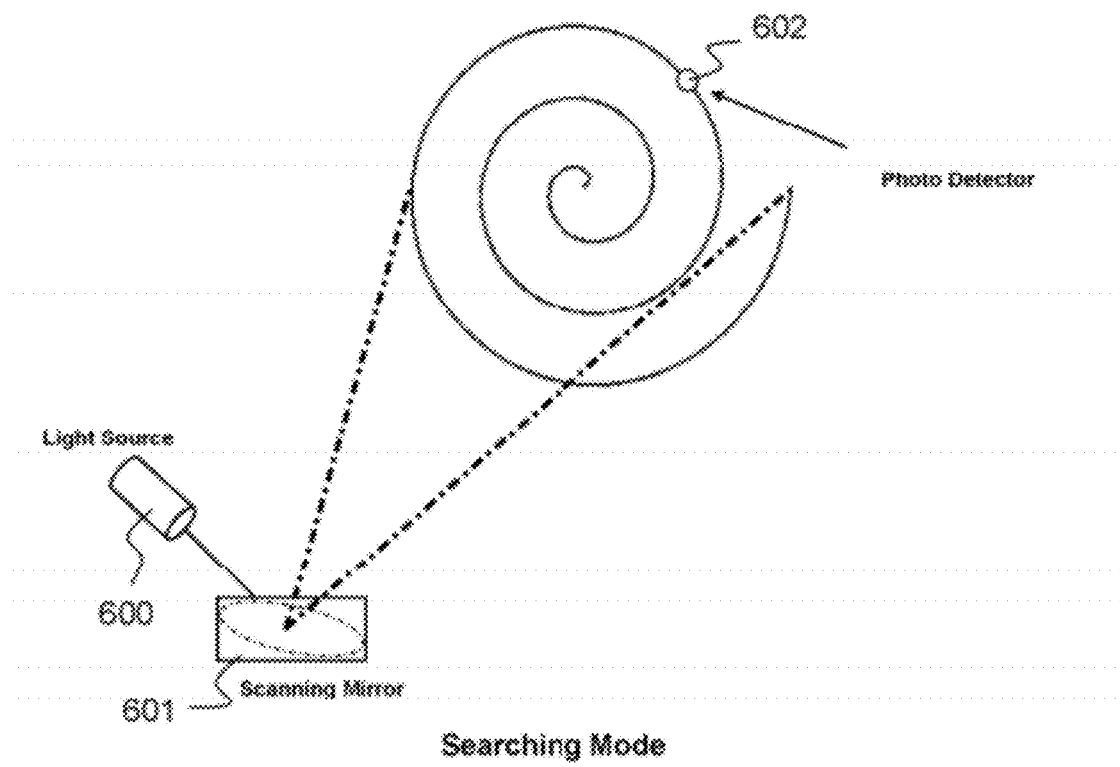
FIG. 6 is a schematic diagram illustrating an optical scanning system operating in a searching mode.

According to embodiments of the present invention, a dual scanner optical tracking system of the type described herein may operate in both a searching mode and a scanning mode. By way of example, and not by way of limitation, FIG. 6 is a schematic diagram illustrating an optical scanning system operating in a searching mode. In this example, the MEMS scanning system includes a light source 600 and scanning mirror 601 that produces a spiraling scan of an optical beam to illuminate a photo-detector 602 at a measurable time. When the photo-detector 602 produces a signal the system can determine the detector's angular position by the knowledge of the portion of the spiral pattern where the signal was obtained.

Figure 7:
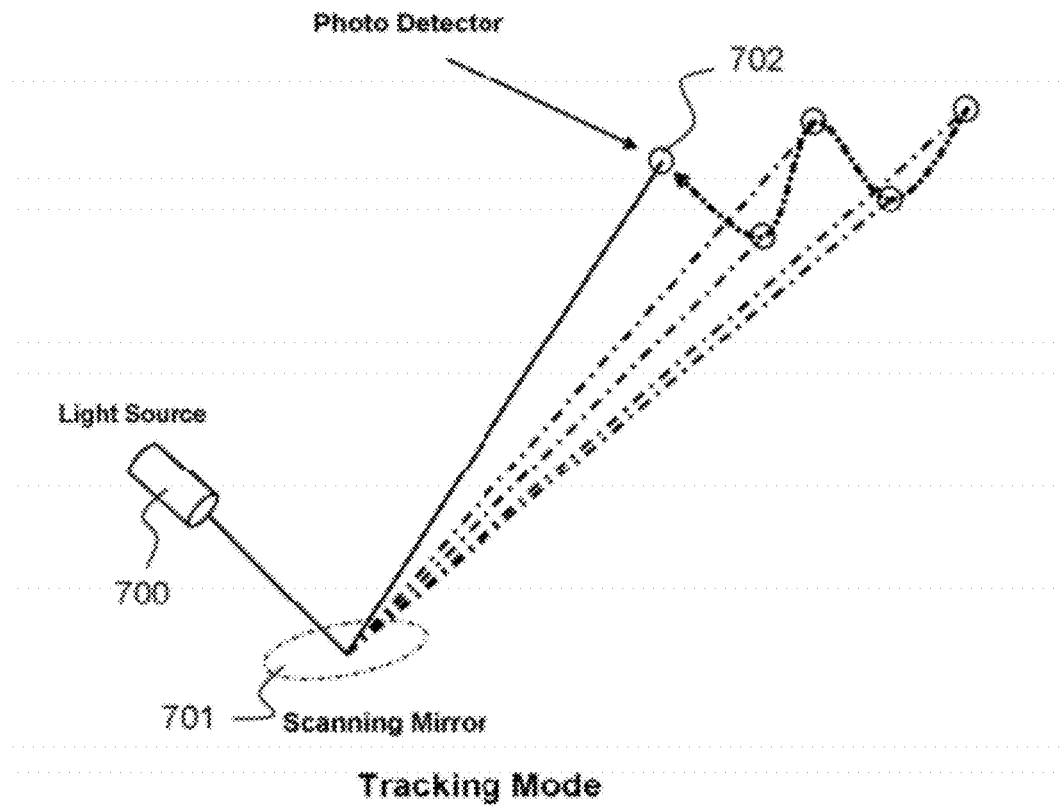
FIG. 7 is a schematic diagram illustrating an optical scanning system operating in a tracking mode.

FIG. 7 is a schematic diagram illustrating an optical scanning system operating in a tracking mode. In this example, the MEMS scanning system includes a light source 700 and scanning mirror 701 and a photo-detector 702. The operation of an optical scanner system, e.g., as shown in FIG. 1A-FIG. 6, can be used to obtain angular position and overall 3D position of object. On the other hand such rastering or spiral-scanning operation can be used only to initially search the position of the detector. After the detector's initial position is found by covering the entire volume with an optical beam, the system can enter a tracking mode in which the rastering of volume is terminated and the system only maintains the optical beam on the object at all times. This tracking can be done in various ways. For example, the photo-detector 702 may provide such a correction signal to the system if it is e.g. a quadrant detector with four photo-diodes. Alternatively, the scanning system may use a dithering algorithm or a mutation algorithm to maintain a small search area around the photo-detector such that it can continue to point toward the detector as the detector moves in 3D volume.

Figure 8A:
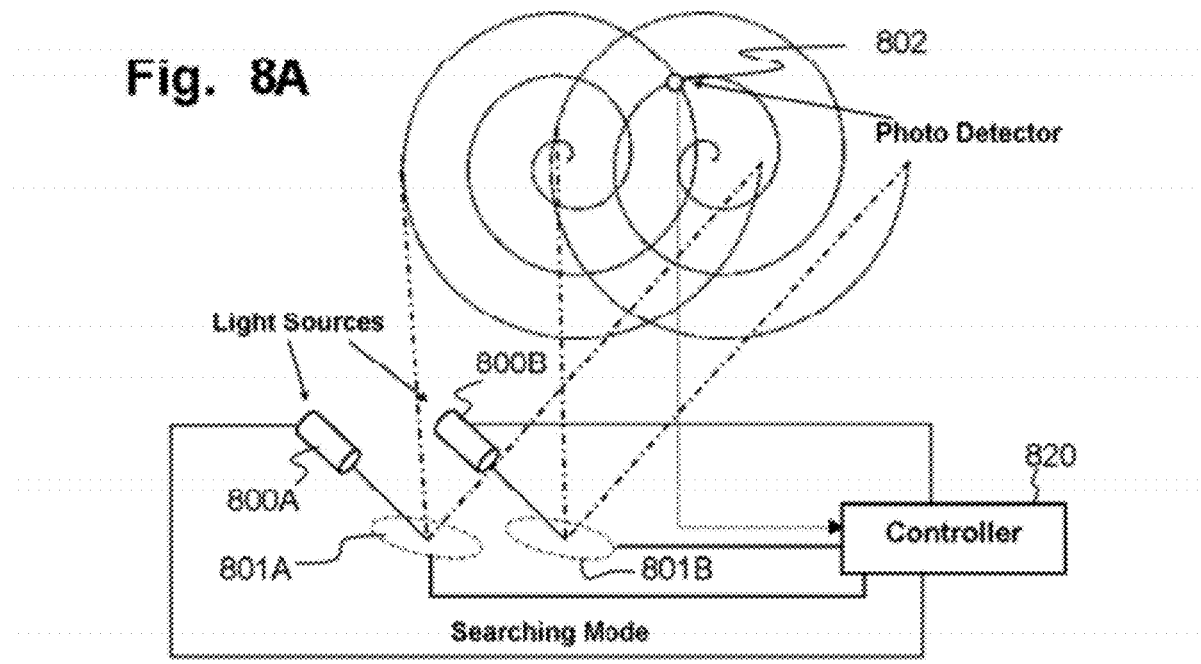
FIG. 8A is a schematic diagram illustrating a dual scanner system operating in a searching mode in accordance with an embodiment of the present invention.
Figure 8B:
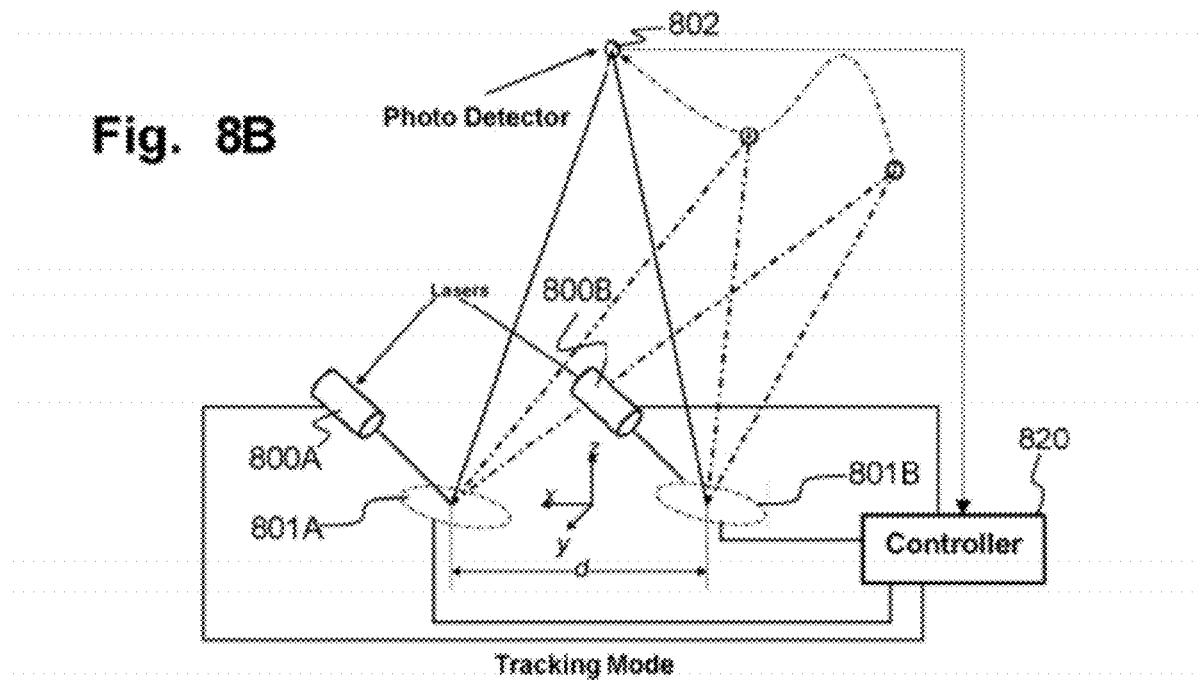
FIG. 8B is a schematic diagram illustrating a dual scanner system operating in a tracking mode in accordance with an embodiment of the present invention.

FIG. 8A schematically illustrates a dual scanner system operating in a searching mode in accordance with an embodiment of the present invention. Two scanning systems each comprised of an optical source 800A,800B (e.g. laser or LED) and a scanning mirror device 801A, 801B both in spiral search mode. The scanning mirror devices 801A, 801B are controlled by a controller 820, which may be programmed with suitable software. Alternatively, the functions of the controller 820 may be implemented by suitably configured electronic hardware or firmware. A photo-detector 802 located on the target may also be configured to communicate with the controller 820, e.g., by wireless link. Each respective scanning mirror device 801A, 801B may operate in search mode until the photo-detector 802 provides a signal to the controller 820 indicating that it has detected beams from the optical sources 800A, 800B. At that time the current position of the detector may be obtained from the two-dimensional angular positions of the scanning mirror devices 801A, 801B and the current position may be used for further tracking. Each sub-system may multiplex with the other as described above, e.g. by time-multiplexing (one beam is on at a time.) To facilitate such multiplexing, the optical sources 800A, 800B may be coupled to the controller 820 and the controller may turn the sources on and off in an alternating fashion so that only one source is on at a time. The controller 820 can then attribute any signal received during a given time interval to the scanning mirror device corresponding to the source that is on during that interval. In FIG. 8B a dual scanner system operating is in a tracking mode in accordance with an embodiment of the present invention. Two scanning systems are now in tracking mode and both repeatedly obtain angular position of the detector 802 with respect to their own co-ordinate systems' origins.

In another alternative embodiment, the above-described system may be adapted to reflectively track an object or alternatively, to scan over a larger object and measure reflected light from multiple locations, forming an image of the object.

In the prior art, the scanning system is arranged such that the outgoing beam and returning beam both pass over the mirror. Mirror's pointing corrections toward the target result in the laser source beam and the reflected beam following nearly identical paths. Finally, the reflected beam 30, is separated from the outgoing beam at the beamsplitter such that its intensity can be measured by a photo-detector. The disadvantage such a configuration is that if the scanning mirror is small, very little of the reflected light is received and conveyed to the photo detector. Further, if the mirror is small, any movement of the reflected beam, i.e. change of position of the reflecting beam with respect to the mirror, could be lost and result in loss of tracking. Namely, when e.g. a retro-reflecting target is moving, there will be movement of the reflected beam on the mirror which if small will not capture the movement and allow the photodetectors to detect it. Therefore such systems typically utilize larger mirrors, more bulky and power consuming or very slow scanning. Another disadvantage of such typical designs is that they require beam splitters or some form of separation of outgoing and returning (reflected) beam. Beam-splitters can be costly and the overall optical system is bulky. The light loss associated with using a beamsplitter can be significant, e.g. 50% in a basic splitter. Embodiments of the present invention, by contrast, can use very small and fast moving mirrors, e.g., gimbal-less MEMS-based two-axis scanning mirrors. An example would be a mirror of 1-mm diameter which can be designed to move from point to point in less than half a millisecond. With the use of a fast moving mirror, the system can track a fast-moving target or acquire images at fast refresh-rates. Certain embodiments could even utilize special raster-scanning micromirrors which are designed for displaying video. Such mirrors have a fast scanning axis over 10 kHz, sometimes >20 kHz and small diameter. To take advantage of such MEMS-based mirrors, it is important to dis-associate the size of the outgoing (scanning) aperture and the size of the receiving (photo sensor) aperture.

Another type of prior art system integrates the photo sensors with the scanning platform such that both are scanning. There is a significant disadvantage in this method in that the entire apparatus would be moving at much slower speeds than a smaller scanning MEMS mirror. It is very advantageous to maintain a small inertia and to utilize all moving area as the mirror to maximize performance. Therefore it is undesirable for the photodetectors to be scanning with the mirror. It is more desirable for the photo-detector to be static and as close to the mirror as possible to receive as much of the diverging return radiation as possible.

Figure 9:
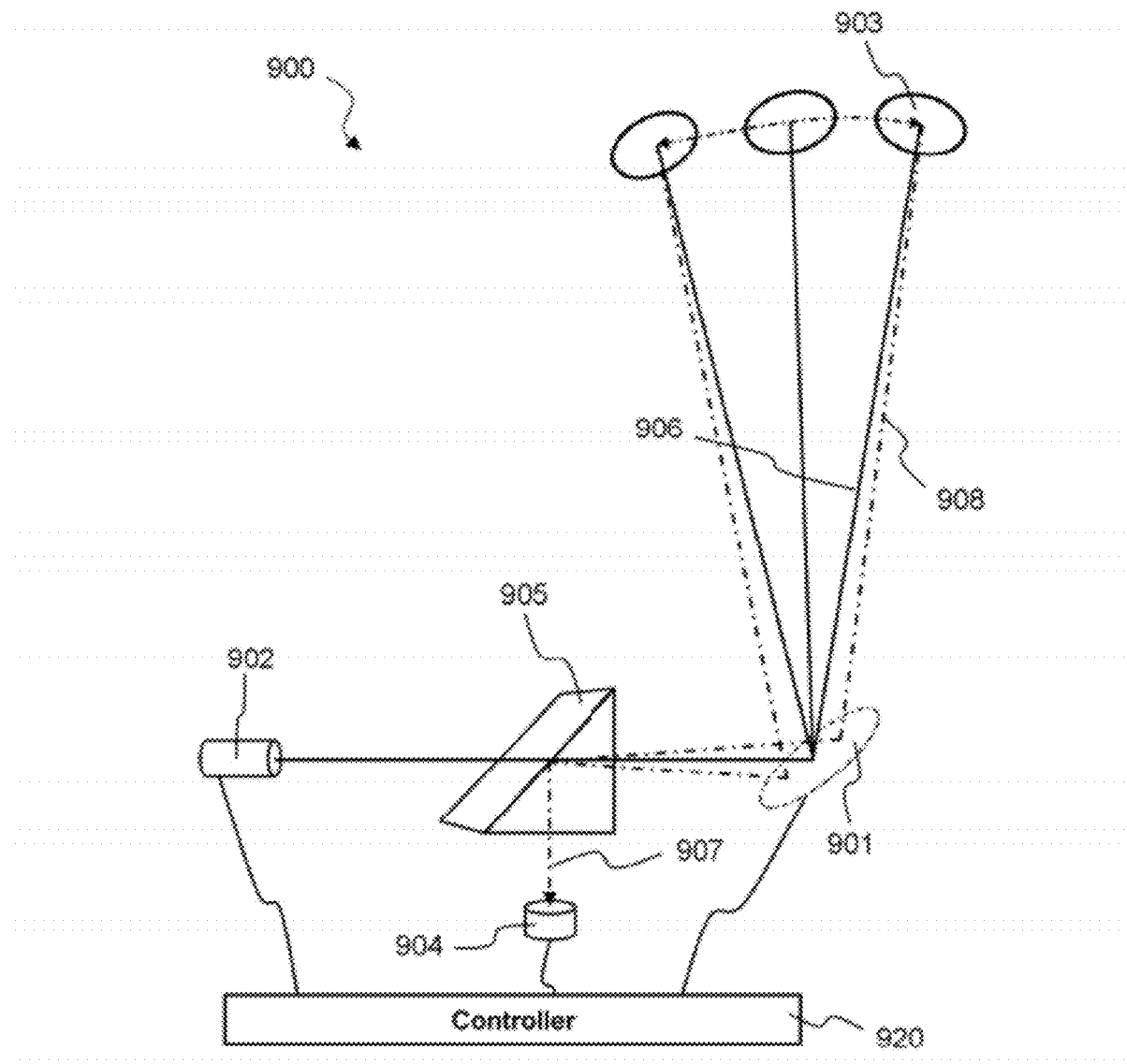
FIG. 9 is a schematic diagram illustrating a system in which a beam sent out into the 3D volume reflects from a retro-reflector, is then reflected back to the scanning mirror after which it is separated from returning by a beam-splitter and terminated at a photo sensor.
Figure 10:
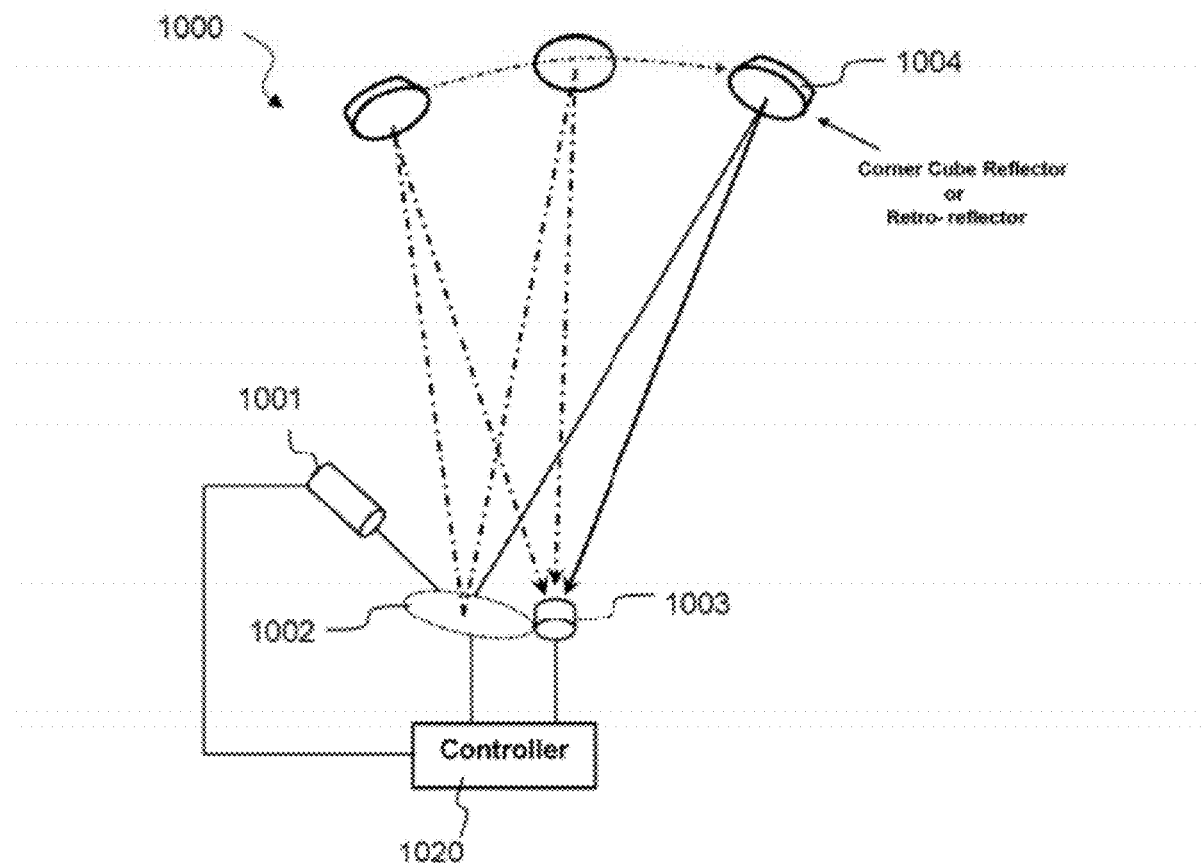
FIG. 10 is a schematic diagram illustrating tracking of a reflective object with a photo-detector in close proximity to a MEMS mirror.

FIG. 9 is a schematic diagram of a scanner system 900 illustrating a variation on the system of FIG. 10 in which a beam sent out 906 from the source 902 into the 3D volume is separated from returning beam 908 from the retro-reflector 903 by a beam-splitter 905. Such a system may include polarized optical beams, polarization rotating elements and a beam-splitter. In this case, returning beam 908 is deflected by the scanning mirror 901 through the beam splitter 905 and becomes beam 907 towards a detector 904. In this way the photo-detector 904 may be placed further away from the scanning mirror 901 while still receiving a significant portion of the reflected optical energy. The scanning mirror 901, source 902, and detector 904 can be coupled to a controller 920, which can be configured (e.g., programmed) to operate as described above. The functions of the controller 902 may alternatively be implemented by suitably configured electronic hardware or firmware.

It is noted that for the purposes of illustration only a single scanning mirror, light source, and photo-detector are shown coupled to the controller 820. For three-dimensional tracking, two scanner systems, each with a light source, scanning mirror and photo-detector can be coupled to the controller 920. Alternatively, three dimensional tracking can be implemented with a single photo-detector for embodiments in which the controller uses a nutation algorithm to maintain tracking of the target.

FIG. 10 is a schematic diagram of a scanner system 1000 schematically illustrating tracking of a reflective object, such as a light source 1001, with a photo-detector in close proximity to a MEMS mirror. In this setup, a photo-detector 1003 may be placed in close proximity with the MEMS mirror 1002. The source 1001, MEMS mirror 1002, and photo-detector 1003 can be coupled to a controller 1020. The object 1004 being searched in the 3D volume may include a retroreflector ("cats eye") or a corner-cube reflector (both of which have been used in experiments.) When the scanning system (with the MEMS mirror 1002) illuminates the target, a reflected beam is returned back to approximately the same position of the scanning system. Due to beam divergence much of the reflected beam may not arrive at the mirror, but instead illuminates the surrounding area. The photo-detector 1003 will therefore detect the reflected optical signal and the rest of search or tracking methodology follows as in previous examples. This method has the advantage of not requiring a wire/communication link to the object being tracked and synchronous communication to a photo-detector near or on the object. The object 1004 just needs to include a retro-reflective body. To obtain the spectroscopic information and therefore the three-dimensional (e.g., X, Y, and Z) location of the object, 2 photo-detectors may be placed in close proximity with two MEMS mirrors, in two separate scanning systems as described in earlier examples. In this manner both devices can simultaneously illuminate the target as their respective reflections return to appropriate and separate receivers and are therefore fully independent. This method has the advantage of not requiring a wire/communication link to the object being tracked, as the sensors are at the MEMS system location. It is noted that for the purposes of illustration only a single scanning mirror, light source, and photo-detector are shown coupled to the controller 1020. For three-dimensional tracking, two scanner systems, each with a light source, scanning mirror and photo-detector can be coupled to the controller 1020. The functions of the controller 1020 may be implemented in suitably configured software running on a general purpose computer or alternatively be implemented by suitably configured electronic hardware or firmware.

Figure 11A:
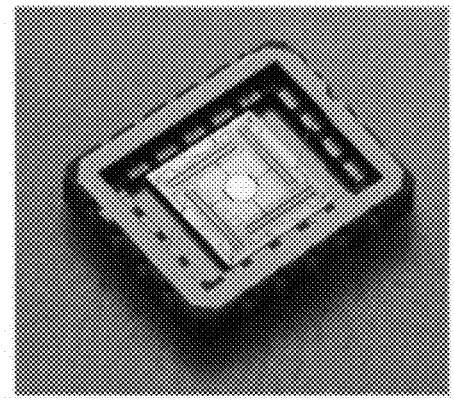
FIG. 11A is a photograph of a packaged gimbal-less dual-axis device used in conjunction with an embodiment of the invention.
Figure 11B:
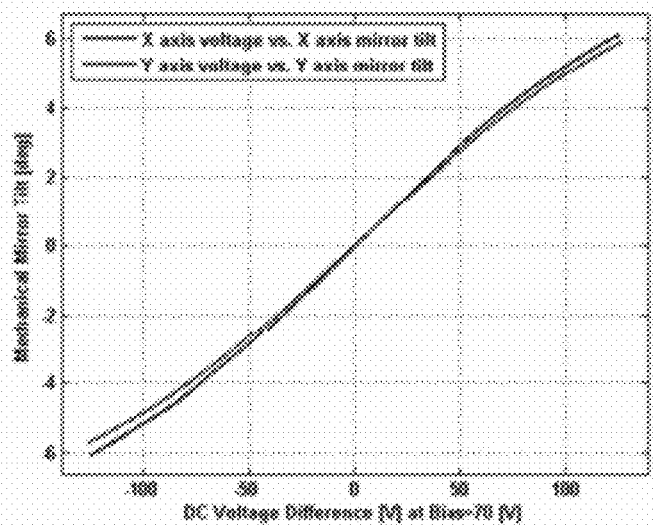
FIG. 11B is a graph of Voltage vs. Mechanical tilt angle measurements of a typical device of the type shown in FIG. 11A linearized by a 4-channel amplifier differential driving scheme.
Figure 11C:
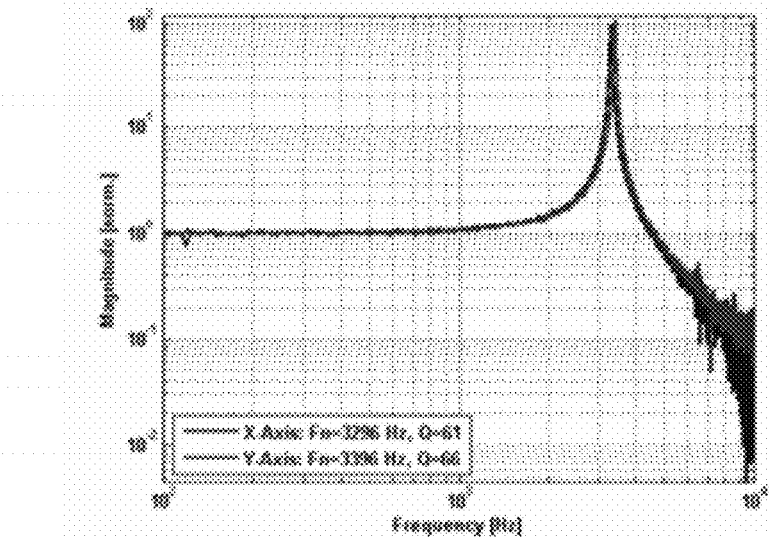
FIG. 11C is a graph of small-signal characteristics of fast devices with 1.0 mm mirror used in embodiments where larger aperture size is not required.

An example of a dual beam scanner object position location and tracking system is depicted in FIGS. 11A-11C. FIG. 11A is a photograph of a gimbal-less dual-axis 4-quadrant devices used in conjunction with an embodiment of the invention. This particular device is capable of a mechanical tilt from −8° to +8° on both axes. The device shown has a 2 mm mirror, this larger aperture being more suitable for the setup of the type shown in FIG. 9(b). FIG. 11B is a graph of Voltage vs. Mechanical tilt angle measurements of a typical 4-quadrant device of the type shown in FIG. 11A linearized by a 4-channel amplifier driving scheme. FIG. 11C is a graph of small-signal characteristics of fast devices with 0.8 mm mirror used in a setup of the type shown in FIG. 8A and FIG. 8B, where larger aperture size is not required.

Figure 12A:
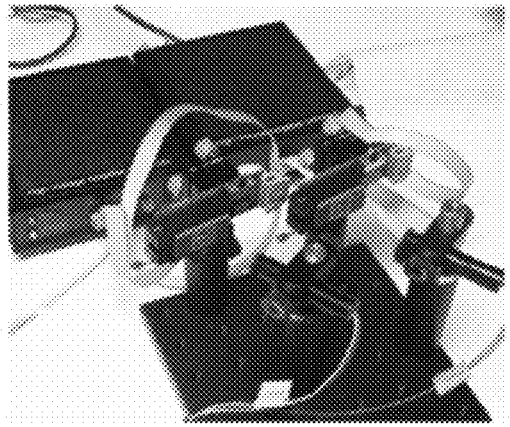
FIG. 12A is a photograph of an optical tracking system in accordance with an embodiment of the invention that utilizes two MEMS scanners and amplifiers.
Figure 12B:
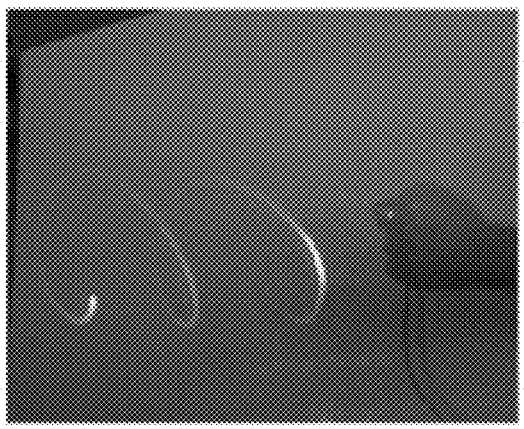
FIG. 12B is a 2 s long exposure photograph of a quad-detector operating in a tracking mode.

FIG. 12A is a photograph of an optical tracking system in accordance with an embodiment of the invention that utilizes two MEMS scanners and amplifiers. In this example, the devices are d=75 mm apart and aimed in the same direction. Each amplifier in the background is driven by an FPGA closed-loop controller. FIG. 12B is a 2 second long exposure photograph of quad-detector operating in a tracking mode. In this case laser spots from both scanners are on the detector, and both devices successfully track the target.

Figure 13:
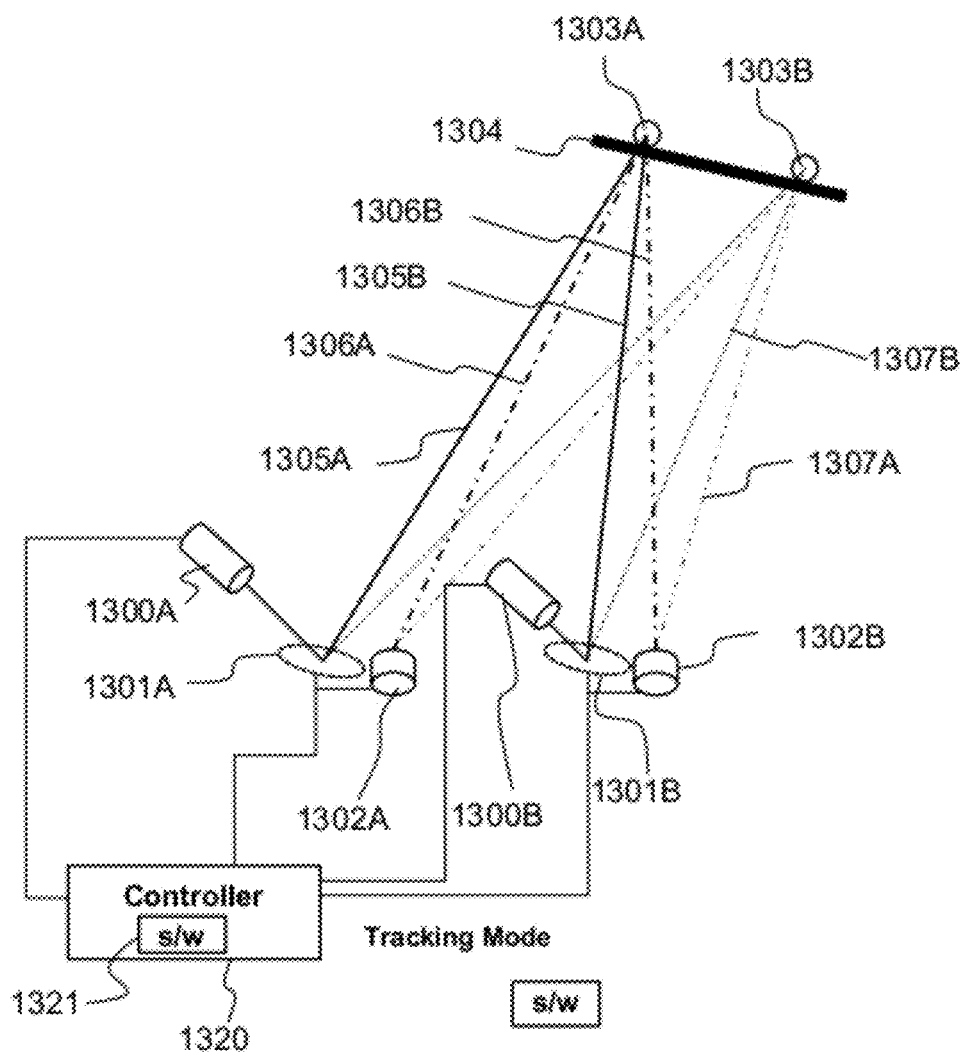
FIG. 13 is a schematic diagram illustrating a method of determining and tracking and object's position and orientation in accordance with an embodiment of the present invention.

FIG. 13 is a schematic diagram illustrating a method of object position location tracking in accordance with an embodiment of the present invention. The tracking beam 1305A, 1305B from light sources 1300A, 1300B is aimed at and continues to follow two corner cube retro reflectors 1303A, 1303B placed on the rod under test 1304 by previously described methods or any other methods available in the art. The returning beams 1306A, 1306B are received by photo detectors 1302A, 1302B placed by the MEMS mirrors 1301A, 1301B. The sources 1300A, 1300B, MEMS mirrors 1301A, 1301B and photo detectors 1302A, 1302B can be coupled to a controller 1320 configured to track the retro reflectors 1303A, 1303B, e.g., according to instructions of suitably configured software 1321. The functions of the controller 1320 may alternatively be implemented by suitably configured electronic hardware or firmware. Since there are two MEMS mirrors tracking two different corner cube retro reflectors, the signals are multiplexed, such that each MEMS mirror is only tracking one reflector at any given time. When a measurement is completed on one target, the controller 1320 can switch the MEMS mirrors 1301A, 1301B from tracking returning beams 1306A, 1306B from one corner cube retro reflector 1303A to tracking returning beams 1307A, 1307B from the second reflector 1303B. Each of the two tracking units can perform its tracking and time-multiplexing between multiple targets independently of the other tracking unit. Their tracking algorithms and processor governing each tracking unit can be different and fully independent, or a single processor can be used to govern both tracking systems with independent driving channels. As described previously, each target's X, Y, and Z position with respect to the tracking systems can be obtained since each tracking system records angle information when pointed to each individual target. Therefore the processor has data available for X,Y,Z location of each target which allows it to compute the vector between the targets or in other words the orientation of the rod 1304 that they are attached to. If the rod under test 1304 is angled in any way, the beam movements will be reflected back on both on the x-axis and the y-axis of the two photo detectors 1302A, 1302B, thereby providing information to the driver of the mirrors to aim to a corrected location. At each such correction step a new measurement of each target's position and a new measurement of the rod's orientation can be obtained. After each acquisition of position from one of the targets the system can scan both mirrors to the previously known location of the other target. If the signal is not immediately found, a search algorithm can be initiated from that last known position. Due to fast switching or multiplexing from target to target in most cases the previously known location will still be within tracking distance from the current position of each target and therefore it may not be necessary to search but simply update scan angle to achieve equal signal in all photosensors (acting as a quad-cell photodiode.)

Figure 14:
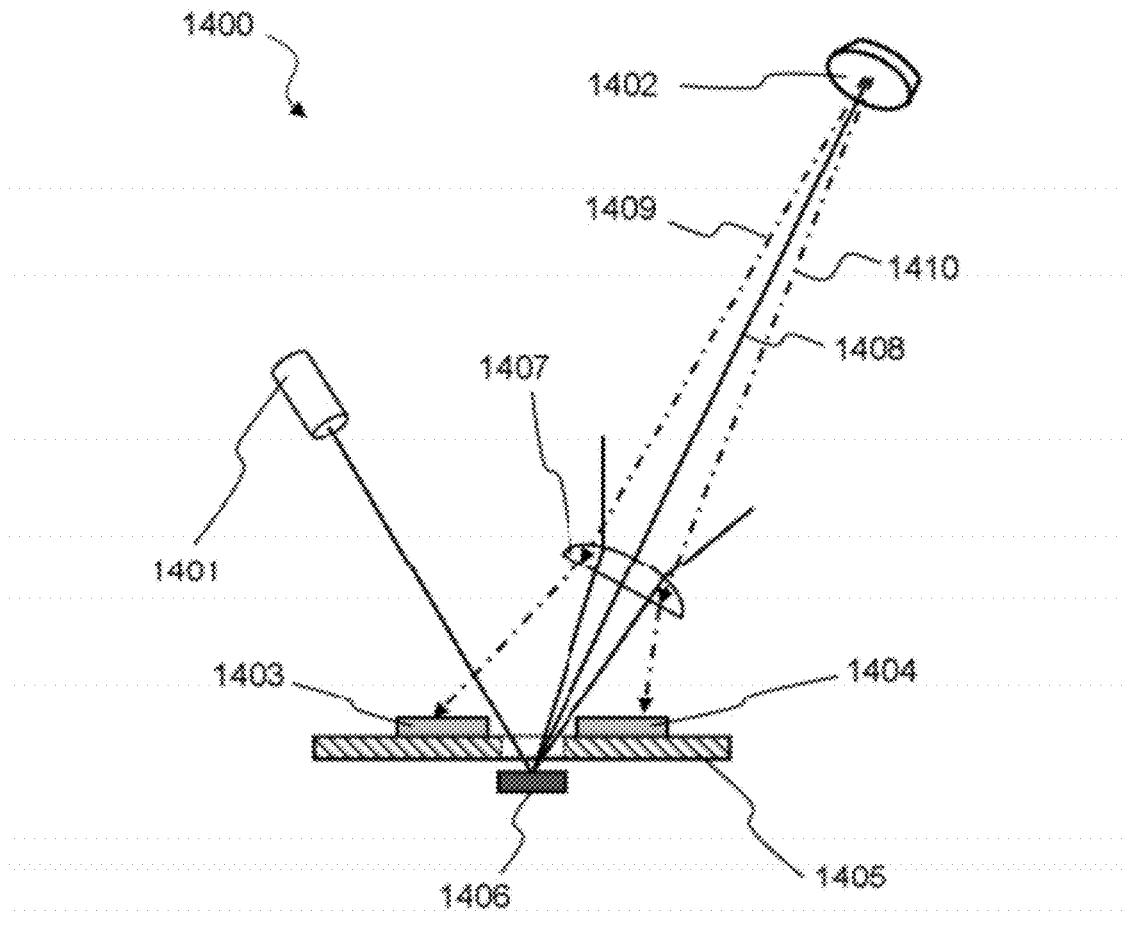
FIG. 14 is a 2-dimensional cross section illustrating the optical tracking system.

FIG. 14 is a schematic diagram of a scanning system 1400 illustrating one possible configuration of the photo detector positions 1403, 1404 relative to the MEMS mirror 1406. In this method, the photo detectors 1403, 1404 are placed on a PCB board 1405 placed above the MEMS mirror 1406, with a wide angle lens 1407 placed in front of the PCB board. The light source 1401 projects the beam through a hole in the PCB board 1405, and the tracking beam 1408 then reflects back out through the same hole, through the wide angle lens 1407 to scan for the corner cube retro reflector 1402. The corner cube retro reflector 1402 is able to reflect the beam 1409, 1410 back from the target 1402 to the photo detectors 1403, 1404 by passing through the wide angle lens 1407. This cross-section only depicts one axis of the system in that it shows only two detectors. These two detectors can provide information about the ratio of illumination between them which allows the system 1400 to determine which direction of scanning of the mirror 1406 is favorable to maintain direct aim at the target 1402. When the target moves, one of the photo detectors may get less illumination while the other may increase. It should be understood that this depiction in one dimensional cross-section does not limit the system, can include a two-axis scanning system with four photodetectors acting as a quad-cell photodiode, giving full two-axis tracking information about the moving target. The only moving component in the tracking system is the mirror 1406. Due to the arrangement of photosensors around the aperture allowing the mirror to scan without interruption, the mirror can be of a substantially small diameter, limited only by the optical beam width and acceptable beam divergence.

Figure 15A:
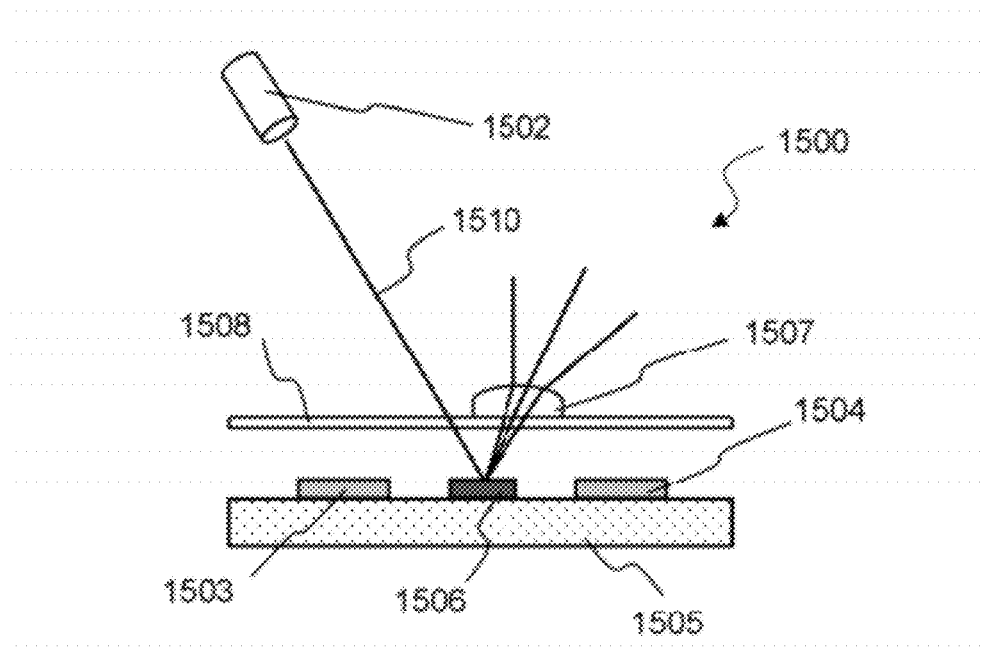
FIG. 15A and FIG. 15B are 2-dimensional cross sections illustrating two variations of the optical tracking system where the photo detectors and MEMS mirrors are placed inside a cavity.
Figure 15B:
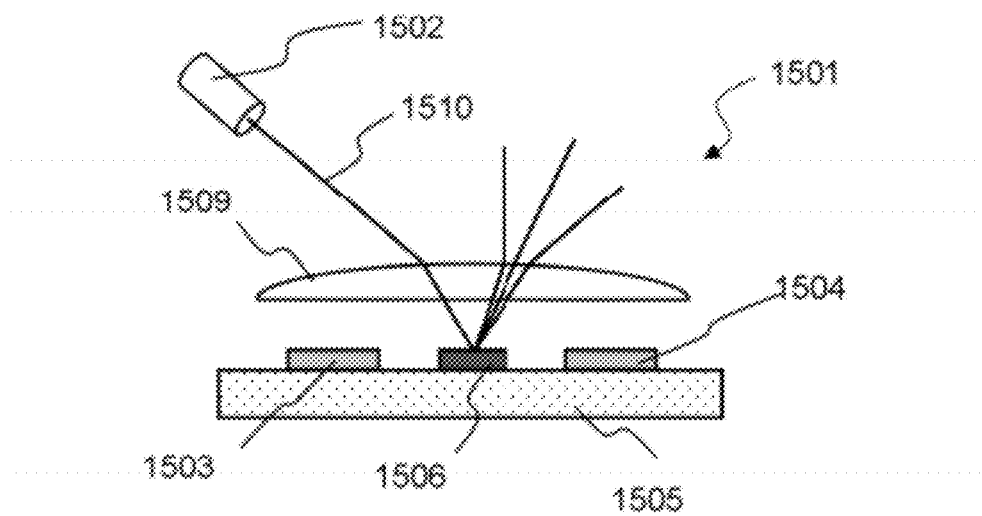

FIGS. 15A and 15B illustrate 2-dimensional cross sections of two different variations of the optical tracking systems where the MEMS mirror 1506 and the photo detectors 1503, 1504 are both placed within the cavity 1505 of a single package. This allows the scanner and detectors to be manufactured as a single packaged unit, and wirebonded to a common set of pins. It may reduce the size and cost of the overall optical subsystem and it would reduce the complexity of making connections to the scanning and sensing components In the FIG. 15A variation 1500, the light source 1502 projects a beam 1510 through a window 1508 which covers the package cavity. Such windows are often used to enclose optical MEMS packages to protect devices while allowing minimally altered optical beam transmission. Optical beam 1510 from the source 1502 passes through the window 1508 onto the MEMS mirror 1506, and the beam is then scanned out through a lens 1507 placed on top of the cavity window 1508. This window 1508 and/or the lens 1507 may be anti-reflection coated to improve transmission. Also the window 1508 and/or the lens 1507 may be selectively filter-coated to allow only a specific wavelength through and e.g. reduce ambient or outdoor light which may interfere with the system. An alternative design 1501 is presented in FIG. 15B, where the cavity window 1508 is replaced with a lens that covers the entire cavity 1509. The lens 1509 allows for the beam 1510 from the light source 1501 to pass through while being scanned by the MEMS mirror 1506 as well as the reflection beams coming back to the photo detectors 1503, 1504. In this embodiment the lens could act as the package window to protect the detectors and scanner within. It may be placed to hermetically seal the cavity if necessary. It should be noted that the lenses 1407, 1507, 1509, 1607, 1608, and 1806 can be convex or bi-convex, or concave, or aspherical, or any other type that allows desired beam propagation and shaping.

Figure 16A:
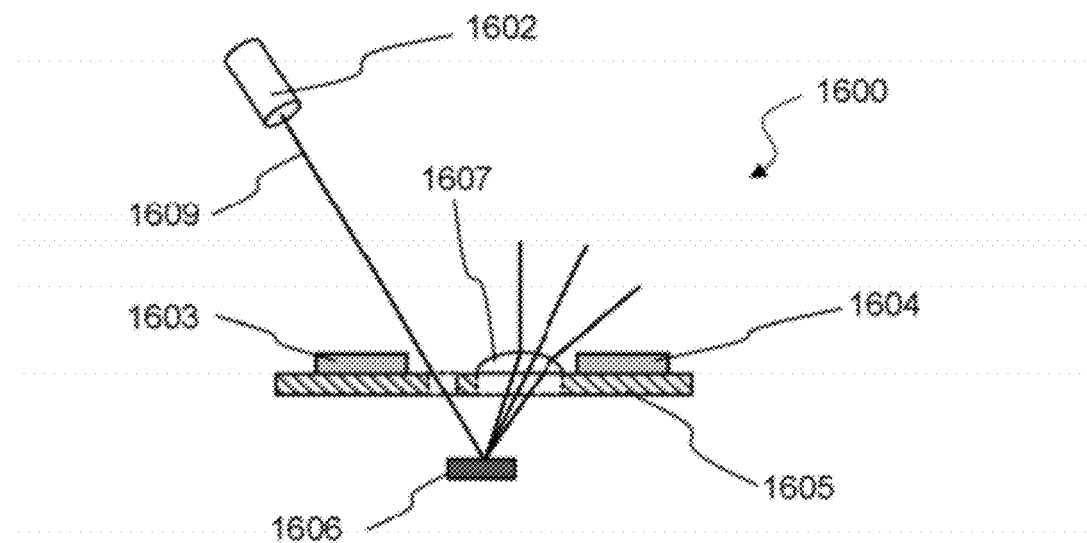
FIG. 16A and FIG. 16B are 2-dimensional cross sections illustrating two variations of the optical tracking system where the photo detectors are placed above the MEMS mirrors on a PCB board.
Figure 16B:
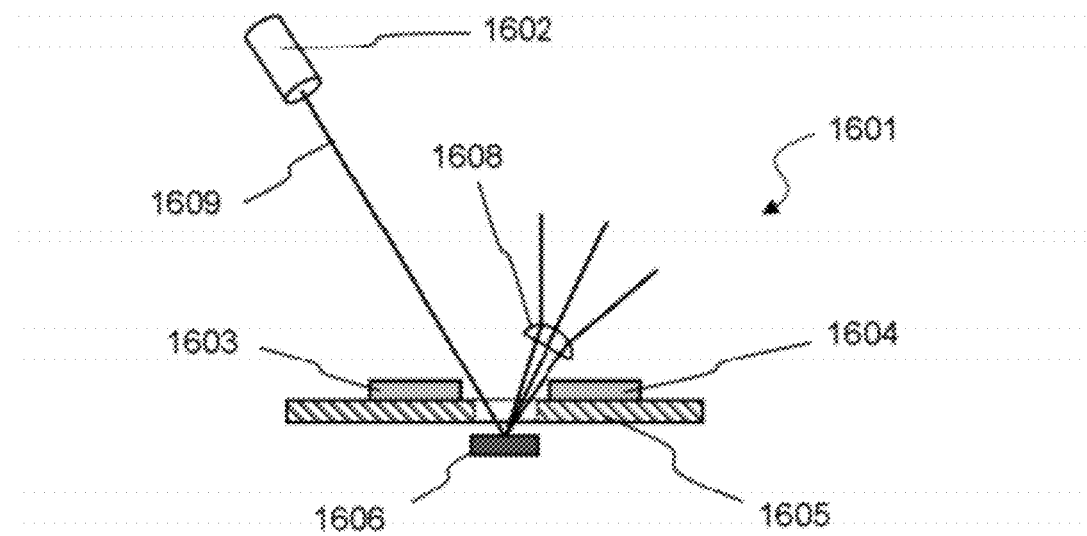

FIGS. 16A and 16B illustrate 2-dimensional cross sections of two different variations of the optical tracking systems where the photo detectors 1603, 1604 are placed on a PCB board 1605 above the MEMS mirror 1606. In the version 1600 in FIG. 16A, the light source 1602 projects the beam 1609 through a hole in the printed circuit board (PCB) 1605 and scanned out through another hole with a lens 1607. Therefore in this arrangement of the optics the lens is placed to affect only the outgoing beams reflected of the mirror 1606, but it does not affect the source beam between the laser and the mirror and it does not affect reflected rays that terminate on the photosensors 1603 and 1604. In FIG. 16B, the system 1601 is set up such that the beam 1609 enters and exits through the same hole, and goes through a lens 1608 placed above the PCB board 1605. Again the lens in 1601 is small and arranged not to affect reflected rays before they terminate on photosensors 1606, and 1605.

Figure 17A:
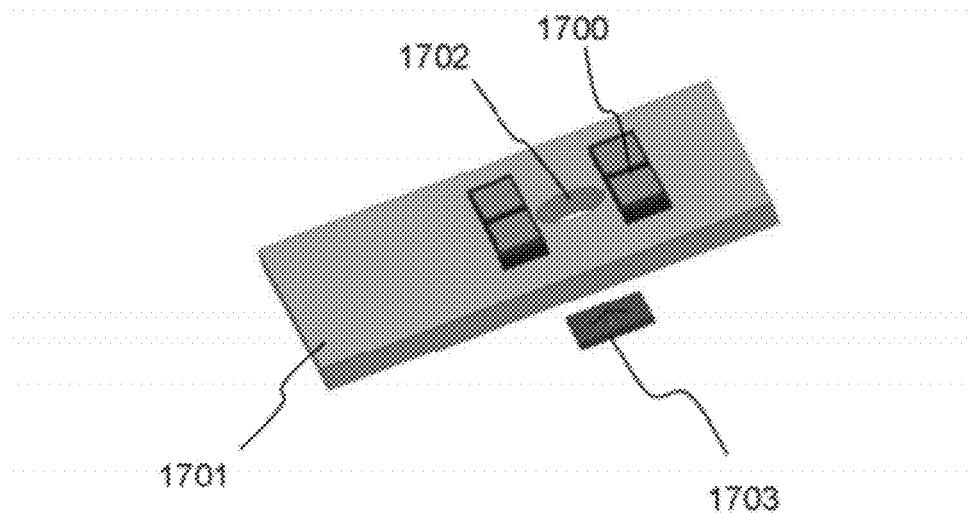
FIG. 17A is a 3-dimensional illustration of a PCB board with photo detectors and a MEMS mirror placed behind a hole on the PCB board.
Figure 17B:
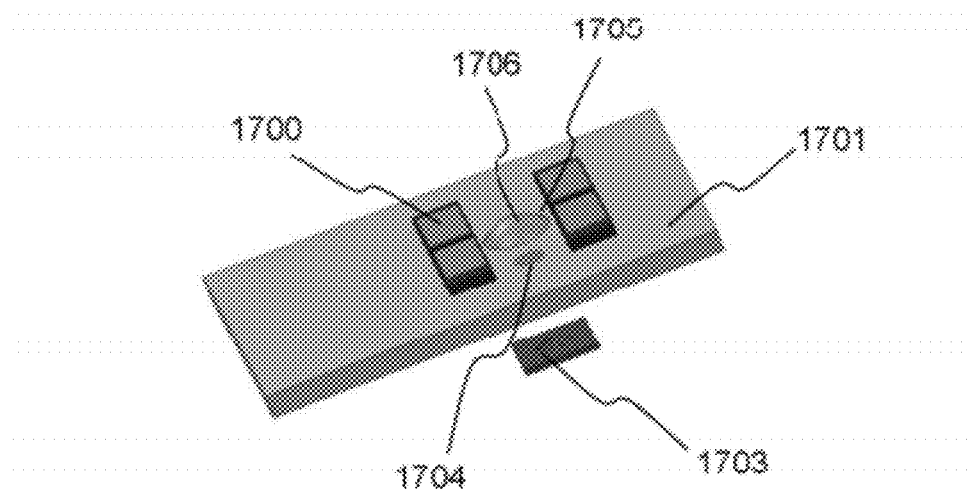
FIG. 17B is a 3-dimensional illustration of a PCB board with photo detectors and a MEMS mirror placed behind a hole containing a lens on the PCB board.

FIG. 17A and FIG. 17B illustrate 3-dimensional models of a PCB board 1701 with photo detectors 1700 mounted on top of the board. A hole 1702 on PCB 1701 allows for a projected beam from a light source to be scanned by a MEMS mirror 1703. In FIG. 17B, the PCB 1701 is modified to have an entrance hole 1704 for an incoming beam from the light source, and a separate exit hole 1705 for which the MEMS mirror 1703 can scan from. A wide angle lens 1706 can be placed in the exit hole 1705 to increase the field of view of the MEMS mirror 1703.

Figure 18A:
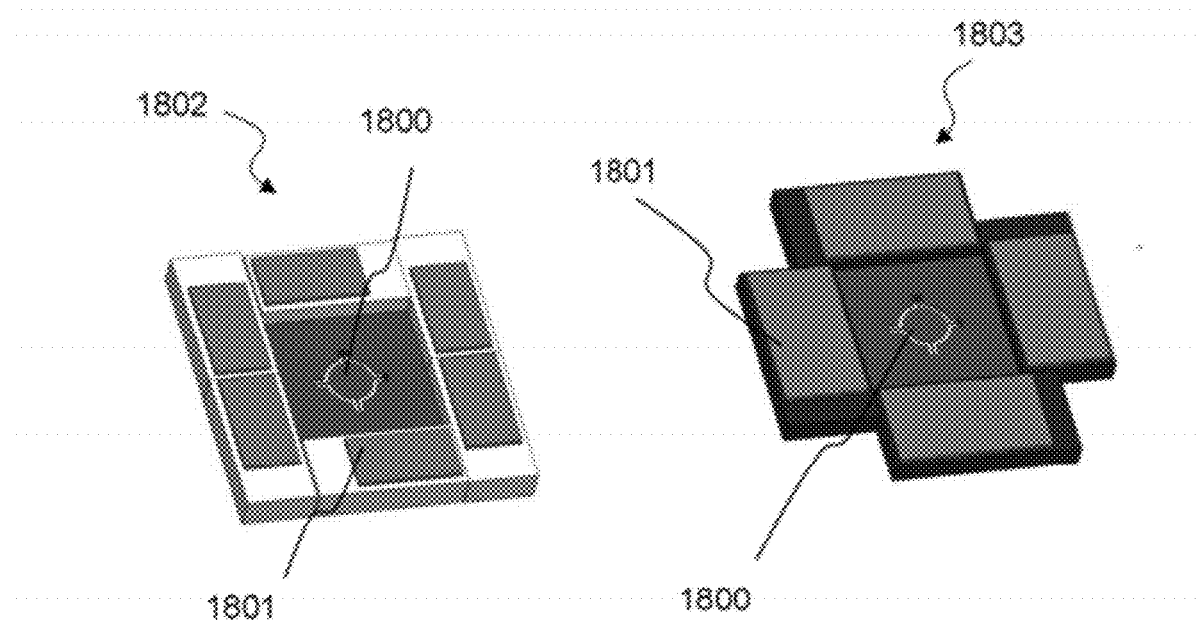
FIG. 18A is a 3-dimensional views illustrating two variations of photo detectors placed around a MEMS mirror in the same cavity.
Figure 18B:
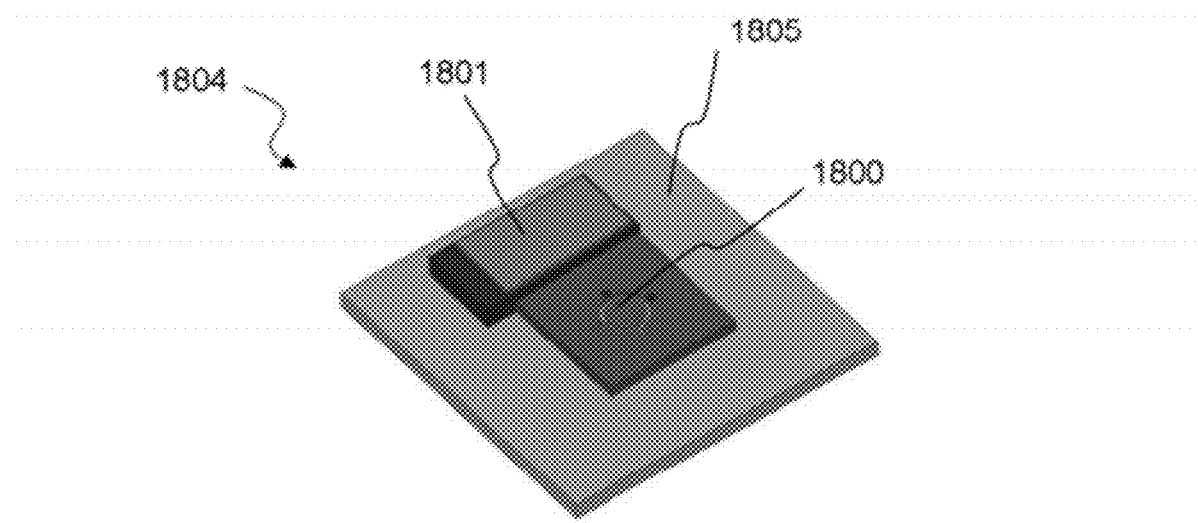
FIG. 18B is a 3-dimensional illustration of a device with one photo detector placed near a MEMS mirror in the same cavity.

FIG. 18A illustrates two different 3-dimensional models of the MEMS mirror 1800 and the photo detectors 1801 all placed within the same cavity, specifically of a four photo detector model 1803, and a six photo detector model 1802. Any number of photodetectors may be used, as well as many types of photodetectors. Based on their arrangement, different established schemes for the determination of error are utilized such as e.g. subtracting the photodiode currents from two photodiodes on the left with two photodiodes on the right, etc. FIG. 18B illustrates a 3-dimensional diagram of an alternative to the MEMS setup shown in FIG. 10. In system 1804 depicted in FIG. 18B, a single photo detector 1801 is placed next to the MEMS mirror 1800, all within the same cavity 1805. A single detector may be sufficient in many imaging applications or in tracking applications where nutation algorithms are utilized to maintain tracking of a target rather than measurement of ratio of received illumination by multiple photodetectors.

It should be noted that the above use of the term PCB is by example and does not limit the choice of substrate used to mount and connect the photo-detectors in front of the scanning mirror. Any number of possible materials can be used as well as various shapes with two most important functions: 1) holding the photo-detectors in designated locations and 2) connecting the photo-detectors to a preamplifier (if needed) and processor, and allowing uninterrupted optical beam scanning.

Figure 19A:
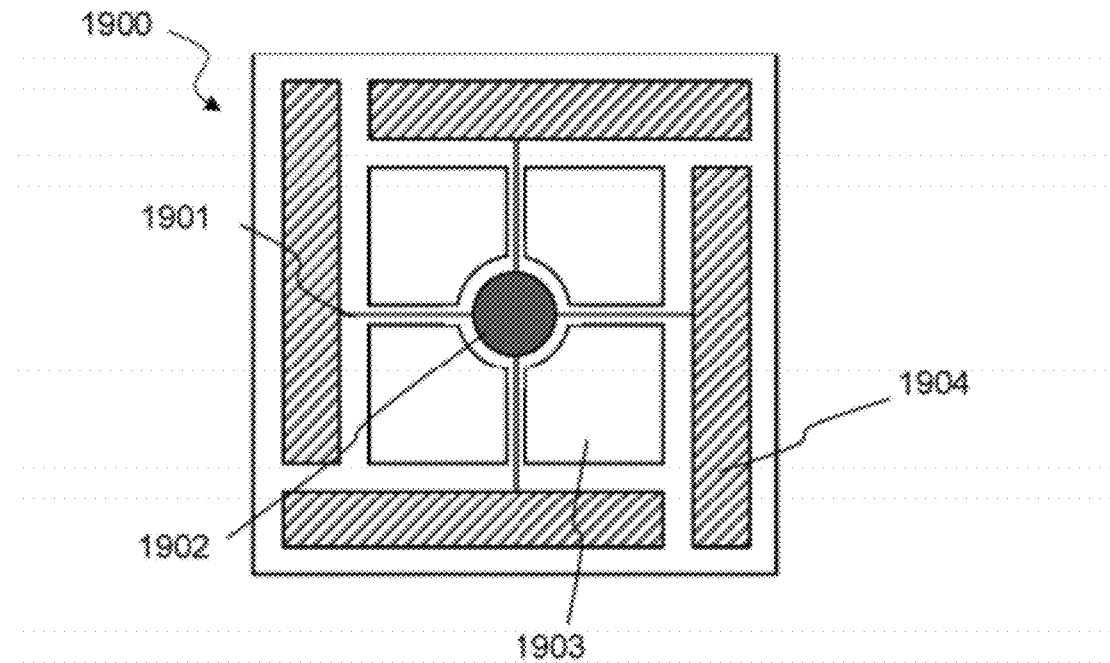
FIG. 19A is a schematic top view of a MEMS mirror chip which is fabricated in silicon and includes surfaces which act as photodetectors as well as a moving surface which acts as the scanning mirror.

Gimbal-Less Two-Axis Scanning Mirror Chip with Monolithically Integrated Photodetectors In above-described embodiments, the scanning MEMS mirror and the photo-detectors can be separate entities fabricated in separate and different processes and which, in most cases, can be separately packaged and procured. Although the photodiodes can be mounted in the same multi-chip module or package as illustrated above, they are still different chips and they require additional cost for fabrication and packaging. Further, photodiodes cannot be placed in the immediate vicinity of the mirror, although the received reflected signal in that location may be most optimal. Embodiments of the present invention depicted in FIG. 19A and FIG. 19B, by contrast, utilize the same monolithic silicon chip for the optical beam scanning as well as for photo-detection. FIG. 19A is a schematic top view of a MEMS mirror chip which is fabricated in silicon and includes surfaces which act as photodetectors as well as a moving surface which acts as the scanning mirror. Most photodetectors are made of silicon and silicon photodetectors can be very efficient and optimal detectors of radiation in wavelengths of interest such as visible and IR for many useful applications. Consequently, certain regions of a monolithic silicon chip can be dedicated to the task of photodetection. At the same time the gimbal-less two-axis scanning MEMS mirror can be made of single crystal silicon and therefore some regions of that same monolithic chip can be dedicated to photo-detection and some to optical beam steering. In some embodiments, actuators for driving the tip-tilt deflection of the MEMS mirror (e.g., electrostatic comb-drive actuators) and flexures connecting the actuators to the mirror can be fabricated into the same monolithic silicon chip.

Figure 19B:
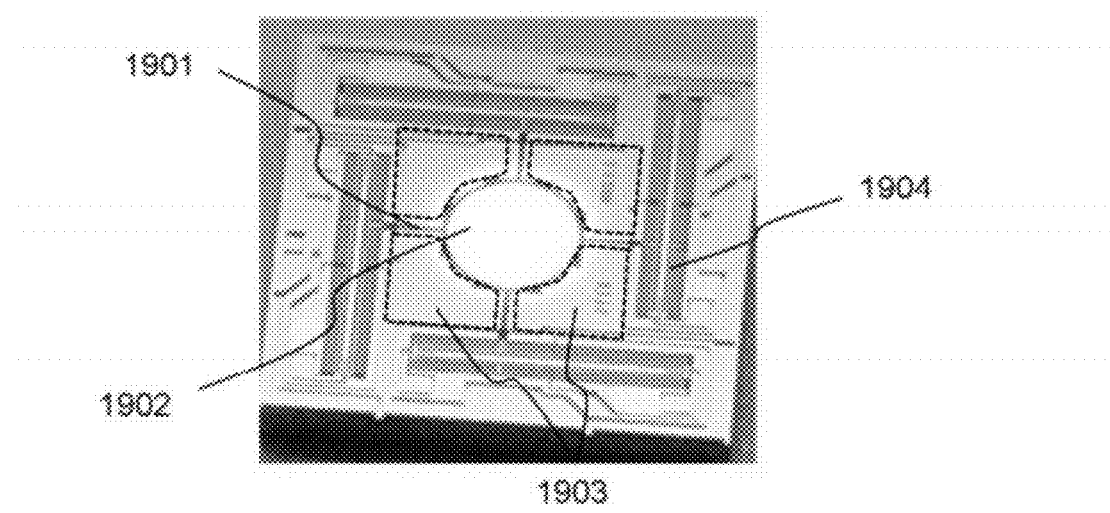
FIG. 19B is a photograph of a gimbal-less two-axis scanning mirror with a 1.2 mm diameter mirror in the center of the chip. Mirror is coated with Aluminum for better reflectivity. Surrounding the mirror are four regions of the silicon substrate which are not utilized toward tip-tilt actuation and can be utilized for photodetection, as illustrated in FIG. 19A.

The regions dedicated to photo-detection can be appropriately doped to improve their photodiode (or other photo-detection) characteristics. The photo-detection regions can be electrically isolated from the mirror regions and from the actuators to allow the photocurrents to be extracted by a wirebond to a nearby preamplifier. FIG. 19B is a photograph of a gimbal-less two-axis scanning mirror with a 1.2 mm diameter mirror in the center of the chip. Mirror is coated with Aluminum for better reflectivity. Surrounding the mirror are four regions of the silicon substrate which are not utilized toward tip-tilt actuation and can be utilized for photodetection, as illustrated in FIG. 19A. In our present experiment we used such chips and demonstrated quad-cell photodiode operation by wirebonding all four of these regions to the package pads and connecting them to four preamplifiers. With the SOI substrate used for MEMS mirror driving, photodiodes have relatively low efficiency and require a very large reverse bias. Although this is possible to use, other embodiments include additional photolithography masks and doping steps to create more optimal photodiode characteristics. One example is to dope the surface of those unused quadrants with p-type doping so that it forms a p-n junction with the underlying n-type SOI substrate.

The mirror 1902 is driven by four actuators 1904 that are coupled to the mirror by flexure beams 1901. Because the actuators require 12 wirebonds to allow full four-quadrant scanning of e.g. −6° to +6°, the monolithically integrated MEMS mirror and photo-detector chip will require 16 wirebonds, including 4 additional wirebonds to contact the photodiode regions.

In additional embodiments the photodiode chips can be directly bonded or attached by adhesive into the four unused silicon areas shown in FIG. 19A and FIG. 19B, such that they are in more optimal proximity to the MEMS mirror and can also be wirebonded into the same package as the scanning MEMS mirror.

Figure 20:
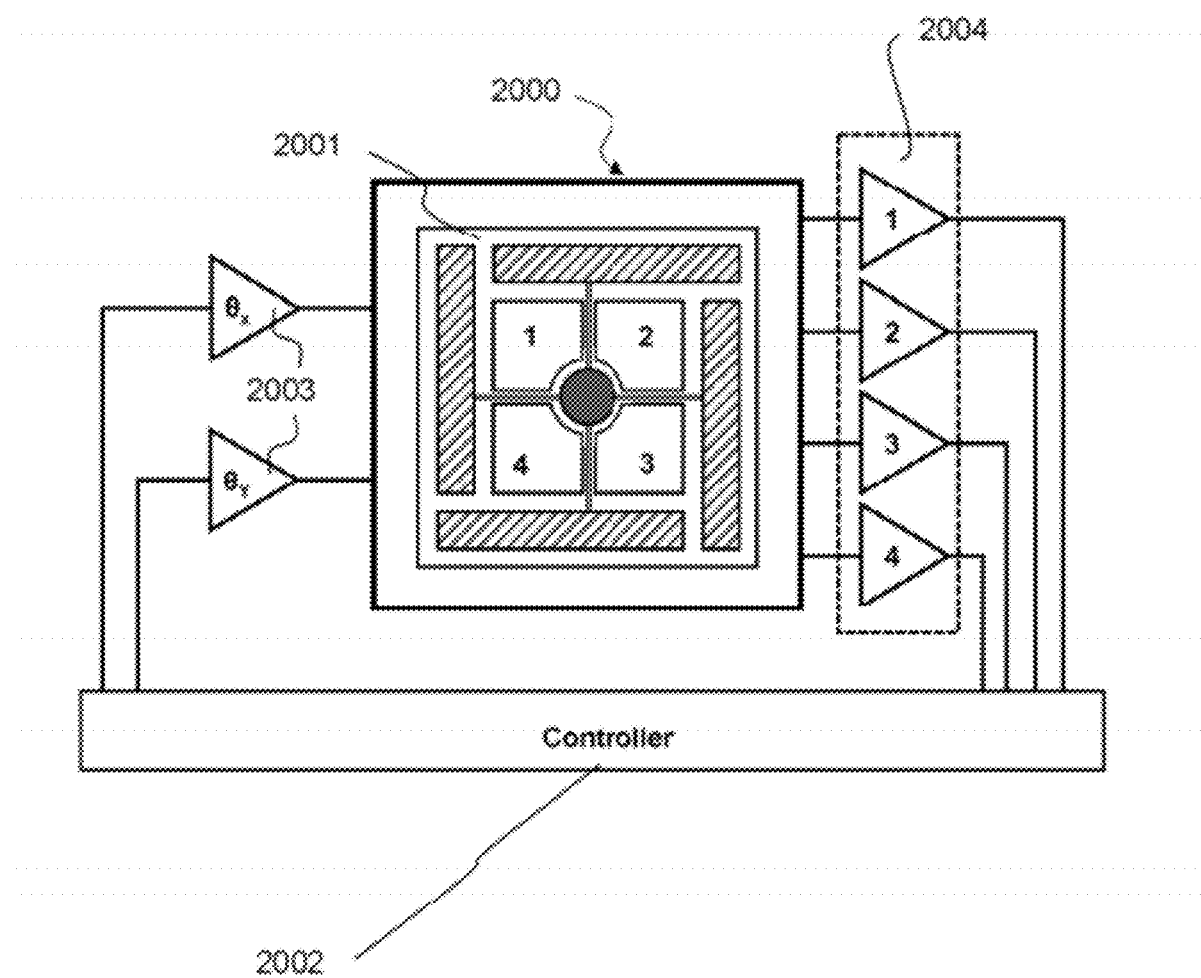
FIG. 20 illustrates a black box setup of the integrated scanning mirror and photo detector device with connections to the high voltage amplifiers for the driving of X and Y tip-tilt actuators, as well as the connections to transimpedance amplifiers for photo detectors.

FIG. 20 illustrates the black box set up 2000 of the integrated scanning mirror and photo detector device 2001 shown in FIG. 19A. The setup 2000 has connected to it, lines from the high voltage amplifiers 2003 for the driving of X and Y tip-tilt actuators. A variety of driving schemes can be used to drive the X and Y tip-tilt actuators, such as biased differential driving. Along with that, the MEMS device 2001 within the black box 2000, has on it 4 photo detecting areas labeled 1-4.

These photo detecting areas can be wire bonded out, with the signals being sent to transimpedance amplifiers 2004, one for each individual photo detecting area (1-4). The inputs to the high voltage amplifiers 2003, and the outputs from the transimpedance amplifiers 2004 are all processed by a separate controller 2002 that is then used to steer the MEMS device 2001 based on the inputs of the photo detectors and the tracking or imaging algorithm by the controller 2002. The functions of the controller 2002 can be implemented in suitably configured software running on a general purpose computer or, alternatively, may be implemented by suitably configured electronic hardware or firmware.

Figure 21:
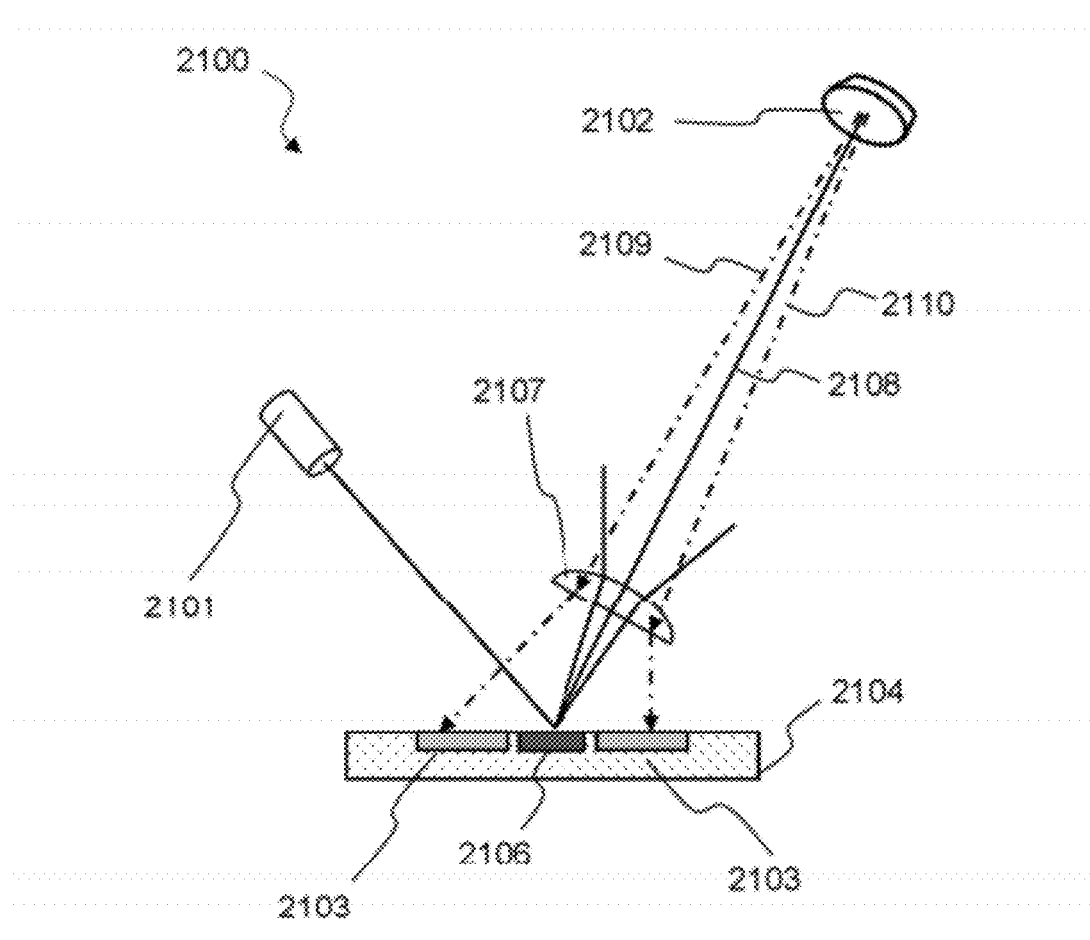
FIG. 21 is a 2-dimensional cross section of the optical setup for using the integrated scanning mirror and photo detector device illustrated in FIG. 19A for tracking and position measurement of a retro-reflective target, and/or for imaging.

FIG. 21 is a 2-dimensional cross section of a system 2100 incorporating an integrated scanning mirror and photo detector device 2104 of the type shown in FIG. 19A. In this embodiment, photo detecting areas 2103 are fabricated in the same piece of silicon 2104 as a MEMS mirror 2106, with a wide angle lens 2107 placed in front of the cavity. The light source 2101 projects the beam onto the MEMS mirror 2106, and the tracking beam 2108 then reflects back out through the wide angle lens 2107 to scan for retro reflector 2102, e.g., a corner cube retro reflector. The retro reflector 2102 is able to reflect the beam 2109, 2110 back from the target 2102 toward the photo detecting areas 2103 by passing through the wide angle lens 2107. It is noted that only two photo detecting areas 2103 are shown in the cross-sectional diagram in FIG. 21. However, the system only depicts one axis of the system in that it shows only two of the four photo detecting areas 2103. These two detecting areas 2103 can provide information about the ratio of illumination between them which allows a processor coupled to the system 2100 to determine which direction of scanning of the mirror 2106 is favorable to maintain direct aim at the target 2102. When the target moves, one of the photo detectors may get less illumination while the other may increase. It should be understood that this depiction in one dimensional cross-section does not limit the system, can include a two-axis scanning system with four photo detecting areas acting as a quad-cell photodiode, giving full two-axis tracking information about the moving target. The only moving component in the tracking system is the mirror 2106.

RESULTS

In experiments, MEMS devices in accordance with embodiments of the present invention provided pointing precision greater than or equal to the DAC's 16-bit resolution, and therefore the overall system results all demonstrated this 16-bit limitation. When a target object was not moving, no single digit of X, Y, Z was changing. Movements of 1-mm on an optical-bench micrometer were easily recorded at a distance of 5 meters. With the loop-gain and bandwidth capable of tracking full-speed human hand motion, the system provided position information at up to 5 meter distance with less than or equal to 20 μm precision on the X and Y axes (up, down, left, right,) and precision on the depth (Z-axis) from 10 μm to 1.5 mm, depending on the distance. Precision can be greatly increased with slower tracking settings and lower loop-gain in different applications.

Embodiments of the invention allow for very high resolution in three-dimensional position, e.g., greater than 10-bit, perhaps 16-bit resolution or more, on a very fast time scale, e.g., greater than 10 kilohertz bandwidth with a relatively simple and inexpensive system. At a 10-kilohertz bandwidth the three-dimensional position of the target object can be measured once every 100 microseconds.

Additional details of results obtained with embodiments of the present invention are described in detail in an article by V. Milanović et al. entitled. "*MEMSEye" for Optical* 3*D Position and Orientation Measurement*, which is included herein as an Appendix in U.S. Provisional Patent Application No. 61/434,652, and which is incorporated herein by reference and excerpted below.

Multiple prototype arrangements were tested. LED tracking tests required the use of significantly larger mirror diameters in order to capture enough light from the LED once the LED was a significant (~1 m) distance away from the sensor. With a 3.2 mm mirror diameter and an aperture to block erroneous reflections to the photo sensor tracking and position measurement was demonstrated up to about 1.25 m distance. Further improvements in sensitivity are filtering of ambient lighting are needed before further characterization for range, precision, etc.

Retroreflector tracking prototypes performed at greater distances, wide angles, and due to the use of a small mirror (1 mm diameter,) significantly greater speeds of target motion were trackable. Robust tracking of both corner cube retroreflector (CCR) targets (FIG. 7*c,d,e*), as well as retro-reflective tape (FIG. 7*a,b*) targets is demonstrated. The MEMSEye system was able to track and follow the individual position of the retro-reflective tape placed on the tip of a pencil (FIG. 7*a*), or on the edge of a cell phone (FIG. 7*b*), in a wide-angle cone of approx. 45°. After some preliminary system calibrations by approximating the angle that each MEMS mirror points to at a given voltage, the XYZ determination algorithm was tested. With preliminary calibration distances are found to be accurate within a few mm in all 3 directions, in a large volume of over 1 m$^3$. Precision and repeatability are better than 1 mm in distance (Z) and better than 0.1 mm in X and Y. Therefore future improvements call for an improved calibration protocol with a complete LUT of angle vs. voltage for each MEMSEye unit.

Furthermore, the MEMSEye system was able to track two CCRs placed on a long rod (FIG. 7e) while multiplexing to determine positions of both CCRs, and from the measured positions create a line vector, providing the azimuth and the elevation angles of the rod. Accuracy and precision of the MEMSEye was tested using a theodolite with arc second accuracy, which held the rod under test. A single target's position was measured while moving in plane with the MEMSEyes down to a sub millimeter precision (FIG. 8a). The main purpose of the theodolite was to test the MEMSEye's ability to measure the azimuth elevation of the rod under test. During the experiment, the rod under test was moved between 0° to 40°, orthogonal to the MEMSEyes. The MEMSEyes were able to track the line vector both in plane and at a different elevation angle to accuracy of around +/−1° (FIG. 8b). Measurements were repeatable to below 0.1°.

PUBLICATION REFERENCES

[1] J. Brophy-Warren, "Magic Wand: How Hackers Make Use Of Their Wii-motes," The Wall Street Journal, Apr. 28, 2007.
[2] P. Arcara, et al, "Perception of Depth Information by Means of a Wire-Actuated Haptic Interface," Proc. of 2000 IEEE Int. Conf. on Robotics and Automation, April 2000.
[3] A. Cassinelli, et al, "Smart Laser-Scanner for 3D Human-Machine Interface," Int. Conf. on Human Factors in Computing Systems, Portland, Oreg., Apr. 2-7, 2005, pp. 1138-1139.
[4] S. Perrin, et al, "Laser-Based Finger Tracking System Suitable for MOEMS Integration," Image and Vision Computing, New Zealand, 26-28 Nov. 2003, pp. 131-136.
[5] V. Milanović, et al, "Gimbal-less Monolithic Silicon Actuators For Tip-Tilt-Piston Micromirror Applications," IEEE J. of Select Topics in Quantum Electronics, vol. 10(3), June 2004.
[6] F. Blais, J.-A. Beraldin, S. El-Hakim, and L. Cournoyer, "Comparison of Pose Estimation Methods for a 3D Laser Tracking System using Triangulation and Programmetry Techniques," SPIE Proceedings, Electronic Imaging 2001, Videometrics and Optical Methods for 3D Shape Measurement VII, San Jose, Calif. Jan. 21-26, 2001.
[7] V. Milanović, W. K. Lo, "Fast and High-Precision 3D Tracking and Position Measurement with MEMS Micromirrors", 2008 IEEE/LEOS International Conference on Optical MEMs and Nanophotonics, ISBN: 978-1-4244-1917-3, pp 72-73, Freiburg, Germany, 11-14 Aug., 2008.

The above cited publication references are incorporated herein by reference for all purposes.

Embodiments of the present invention allow for real-time fast-motion tracking of an object in a 3D volume, while obtaining its precise XYZ co-ordinates may be achieved through the use of MEMS micromirror scanning systems. In one embodiment, two separate scanning MEMS micromirror sub-systems may track an object in a 20 kHz closed-loop. Certain embodiments are capable of tracking full-speed human hand motion provides position information at up to 5 m distance with 16-bit precision, or precision less than or equal to 20 μm on the X and Y axes (up/down, left/right,) and precision on the depth (Z-axis) from 10 μm to 1.5 mm, depending on distance.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. In the claims that follow, the word "or" is to be interpreted as an inclusive "or"; e.g., A or B is satisfied if either A or B individually is present and alternatively satisfied if both A and B are present. The appended claims are not to be interpreted as including means-plus-function limitations, unless such a limitation is explicitly recited in a given claim using the phrase "means for."

What is claimed is:

1. An optical tracking system, comprising:
at least one optical detector unit having a scanning mirror and one or more fixed photodetectors located near the scanning mirror,
wherein the scanning mirror is configured to rotate about one or more axes in order to deflect a light beam from a source towards a target and the photodetectors are configured to collect a portion of the light beam that is reflected from the target, wherein the one or more fixed photodetectors are configured such that the optical path from the source to the optical detector unit does not intersect the scanning mirror along a return portion of the optical path from the target to the one or more photodetectors.

2. The system of claim 1 wherein the photodetectors have a much larger area than the scanning mirror.

3. The system of claim 1, further comprising a lens located between the scanning mirror and the target.

4. The system of claim 3, wherein the lens is configured so that the beam from the scanning mirror travels through the lens on its way to the target and at least some of the retroreflected beam passes back through the same lens on its way to the one or more photodetectors.

5. The system of claim 1 wherein the one or more photodetectors are mounted to a substrate and the scanning mirror is mounted below the substrate.

6. The system of claim 5 wherein the substrate includes separate holes for incoming and outgoing light beams.

7. The system of claim 1 wherein the at least one scanning detector comprises two or more scanning detectors, each of the two or more scanning detectors having a scanning mirror and a fixed photo-detector located near the scanning mirror, wherein the two or more scanning detectors are configured to be used in combination to track the target in three dimensions.

8. The system of claim 7, wherein the target includes two or more retroreflectors separated by a fixed distance.

9. The system of claim 8, wherein each of two or more scanning detectors is configured to track each of the two or more retroreflectors and determine a vector between a particular two of the two or more retroreflectors.

10. The system of claim 1, wherein the scanning mirror and one or more photodetectors are mounted to a common substrate.

11. The system of claim 1 further comprising a controller coupled to the at least one scanning detector, wherein the controller is configured to determine whether the scanning mirror of the at least one scanning detector is aligned to provide an optical path between the optical source and the one or more photo-detectors from one or more detection signals from the one or more photo-detectors, wherein the optical path is retroreflected at the target.

12. The system of claim 11, wherein the at least one scanning detector includes two-dimensional actuators configured to tilt a reflective portion of the scanning mirror with respect to first and second non-parallel axes, actuator coupled to the scanning mirror two or more scanning detectors and wherein the controller is configured to determine a position of the target from control signals to the two-dimensional actuators obtained when the reflector is aligned to provide the optical path, wherein the control signals determine a tilt of the reflective portion with respect to the first and second axes.

13. The system of claim 12, wherein the at least one scanning detector includes two or more scanning mirror, wherein each of the two or more scanning mirrors includes two-dimensional actuators configured to tilt a reflective portion of the scanning mirror with respect to first and second non-parallel axes, wherein the controller is configured to determine a position of the target in three dimensions from control signals to the two-dimensional actuators of the scanning mirrors obtained when the reflective portions are aligned to provide the optical path, wherein the control signals determine a tilt of each reflective portion about its first and second axes.

14. The system of claim 1, wherein the one or more photodetectors include four photodetectors arranged in a quad-cell configuration.

15. The system of claim 11, wherein the one or more photodetectors include a single photo-detector and the controller is configured to use a nutation algorithm to maintain tracking of the target.

16. A scanning optical detector apparatus, comprising:
a substrate;
one or more photodetectors monolithically incorporated into the substrate in fixed positions; and
a scanning mirror having at least one portion monolithically integrated into the substrate, wherein the mirror is configured to rotate about one or more axes with respect to the one or more photo detectors, wherein the scanning mirror is configured to rotate about one or more axes in order to deflect a light beam from a source towards a target and the one or more photodetectors are configured to collect a portion of a light beam that is reflected from the target, wherein the one or more photodetectors are configured such that the optical path from the source to the optical detector unit does not intersect the scanning mirror along a return portion of the optical path from the target to the one or more photodetectors.

17. The apparatus of claim 16, wherein the substrate is single-crystal silicon.

18. The apparatus of claim 16, wherein the scanning mirror is a microelectromechanical system (MEMS) mirror having a reflective portion monolithically integrated into the substrate.

19. The apparatus of claim 16, wherein the scanning mirror includes one or more actuators having at least one portion monolithically integrated into the substrate.

20. The apparatus of claim 16, wherein the one or more photodetectors include one or more silicon photodetectors having at least one portion monolithically integrated into the substrate.

* * * * *